United States Patent
Miyakawa et al.

(10) Patent No.: US 11,137,777 B2
(45) Date of Patent: Oct. 5, 2021

(54) CONTROL APPARATUS, PROGRAM, SYSTEM AND CONTROL METHOD

(71) Applicant: HAPSMobile Inc., Tokyo (JP)

(72) Inventors: Junichi Miyakawa, Tokyo (JP);
Yoshihito Shimazaki, Kanagawa (JP);
Atsushi Yamamoto, Tokyo (JP)

(73) Assignee: HAPSMobile Inc., Tokyo (JP)

(*) Notice: Subject to any disclaimer, the term of this patent is extended or adjusted under 35 U.S.C. 154(b) by 0 days.

(21) Appl. No.: 17/213,244

(22) Filed: Mar. 26, 2021

(65) Prior Publication Data

US 2021/0216084 A1 Jul. 15, 2021

Related U.S. Application Data

(63) Continuation of application No. PCT/JP2019/031709, filed on Aug. 9, 2019.

(30) Foreign Application Priority Data

Oct. 15, 2018 (JP) .............................. JP2018-194688

(51) Int. Cl.
*G05D 1/10* (2006.01)
*H04W 4/46* (2018.01)
(Continued)

(52) U.S. Cl.
CPC ........... *G05D 1/104* (2013.01); *B64C 39/024* (2013.01); *H01Q 1/28* (2013.01); *H04W 4/46* (2018.02);
(Continued)

(58) Field of Classification Search
CPC ................. G05D 1/104; B64C 39/024; B64C 2201/042; B64C 2201/027;
(Continued)

(56) References Cited

U.S. PATENT DOCUMENTS

| | | | | |
|---|---|---|---|---|
| 2,509,632 A | * | 5/1950 | Field .......................... | G01S 1/02 340/905 |
| 2,787,428 A | * | 4/1957 | Schuck ...................... | G01S 1/02 244/183 |

(Continued)

FOREIGN PATENT DOCUMENTS

| | | | | |
|---|---|---|---|---|
| JP | 2002211496 A | | 7/2002 | |
| JP | 2003104295 A | * | 4/2003 | ............. H04B 7/185 |

(Continued)

OTHER PUBLICATIONS (ISA/237) Written Opinion of the International Search Authority for International Patent Application No. PCT/JP2019/031709, mailed by the Japan Patent Office dated Sep. 10, 2019.

(Continued)

*Primary Examiner* — Behrang Badii
*Assistant Examiner* — Jalal C Coduroglu

(57) ABSTRACT

Provided is a control apparatus for controlling a plurality of flying bodies including a first flying body having an antenna for forming a communication area by a beam irradiated toward the ground to provide wireless communication service for a user terminal in the communication area. The control apparatus comprises a selection unit configured to select a flying body of a combination target to be combined with the first flying body from the plurality of flying bodies; and a flying body control unit configured to control combination of the first flying body and the flying body of a combination target.

20 Claims, 16 Drawing Sheets

(51) Int. Cl.
  *B64C 39/02* (2006.01)
  *H01Q 1/28* (2006.01)
(52) U.S. Cl.
  CPC .. *B64C 2201/027* (2013.01); *B64C 2201/042* (2013.01); *B64C 2201/066* (2013.01); *B64C 2201/108* (2013.01); *B64C 2201/122* (2013.01); *B64C 2201/143* (2013.01); *B64C 2201/146* (2013.01)
(58) Field of Classification Search
  CPC ........ B64C 2201/143; B64C 2201/108; B64C 2201/122; B64C 2201/146; B64C 2201/066; H01Q 1/28; H04W 4/46
  See application file for complete search history.

(56) References Cited

U.S. PATENT DOCUMENTS

| | | | | |
|---|---|---|---|---|
| 3,611,371 | A | * | 10/1971 | Morse ..................... G01S 13/62 342/29 |
| 6,116,538 | A | * | 9/2000 | Hafelfinger ............. G09F 21/10 244/31 |
| 2001/0039189 | A1 | * | 11/2001 | Cox ................... H04B 7/18508 455/431 |
| 2009/0012923 | A1 | * | 1/2009 | Moses .................... G06Q 10/10 706/46 |
| 2010/0193625 | A1 | * | 8/2010 | Sommer ................. B64C 37/02 244/2 |
| 2014/0021291 | A1 | * | 1/2014 | Vetter ................... B64C 39/003 244/19 |
| 2015/0172611 | A1 | * | 6/2015 | Nahmiyace .......... H04N 9/3164 353/13 |
| 2016/0046387 | A1 | * | 2/2016 | Frolov ..................... B64B 1/00 244/59 |
| 2016/0134358 | A1 | * | 5/2016 | Jalali .................... H04B 7/2041 455/11.1 |
| 2017/0074666 | A1 | * | 3/2017 | Kobayashi ............ G06F 16/951 |
| 2017/0097260 | A1 | * | 4/2017 | Nagashima ................ G01J 1/44 |
| 2018/0144544 | A1 | * | 5/2018 | Yoo ........................ G06T 15/005 |
| 2019/0261618 | A1 | * | 8/2019 | Okumura .............. B64C 39/024 |
| 2021/0070438 | A1 | * | 3/2021 | Hoshide ................... G01S 1/02 340/905 |
| 2021/0078730 | A1 | * | 3/2021 | Tajika ...................... G01S 1/02 244/183 |

FOREIGN PATENT DOCUMENTS

| | | | | | |
|---|---|---|---|---|---|
| JP | | 2004500786 | A | | 1/2004 |
| JP | | 2020019419 | A | * | 2/2020 ............. B64C 39/02 |
| JP | | 6663468 | B1 | * | 3/2020 ............. B64C 19/02 |
| JP | | 2020198481 | A | * | 12/2020 ............. H04W 76/11 |
| WO | WO-2020079934 | A1 | * | 4/2020 ............... G08G 5/00 |
| WO | WO-2020079935 | A1 | * | 4/2020 ............. H04B 7/185 |
| WO | WO-2020240921 | A1 | * | 12/2020 ............. H04W 16/28 |

OTHER PUBLICATIONS

Decision to Grant a Patent issued for counterpart Japanese Application No. 2018-194688, issued by the Japanese Patent Office dated Feb. 12, 2020 (drafted on Feb. 4, 2020).

* cited by examiner

CONTROL APPARATUS, PROGRAM, SYSTEM AND CONTROL METHOD

The contents of the following applications are incorporated herein by reference: NO. 2018-194688 filed in JP on Oct. 15, 2018 and NO. PCT/JP2019/031709 filed in WO on Aug. 9, 2019

BACKGROUND

1. Technical Field

The present invention relates to a control apparatus, a program, a system and a control method.

2. Related Art

Known is a flying body that includes an antenna and flies in the stratosphere, so as to provide a stratosphere platform (for example, refer to Patent Document 1).

CITATION LIST

Patent Document

Patent Document 1: Japanese Patent Application Publication No. 2002-211496

Technical Problem

It is preferable to provide a technology capable of changing a function of a flying body depending on situations.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
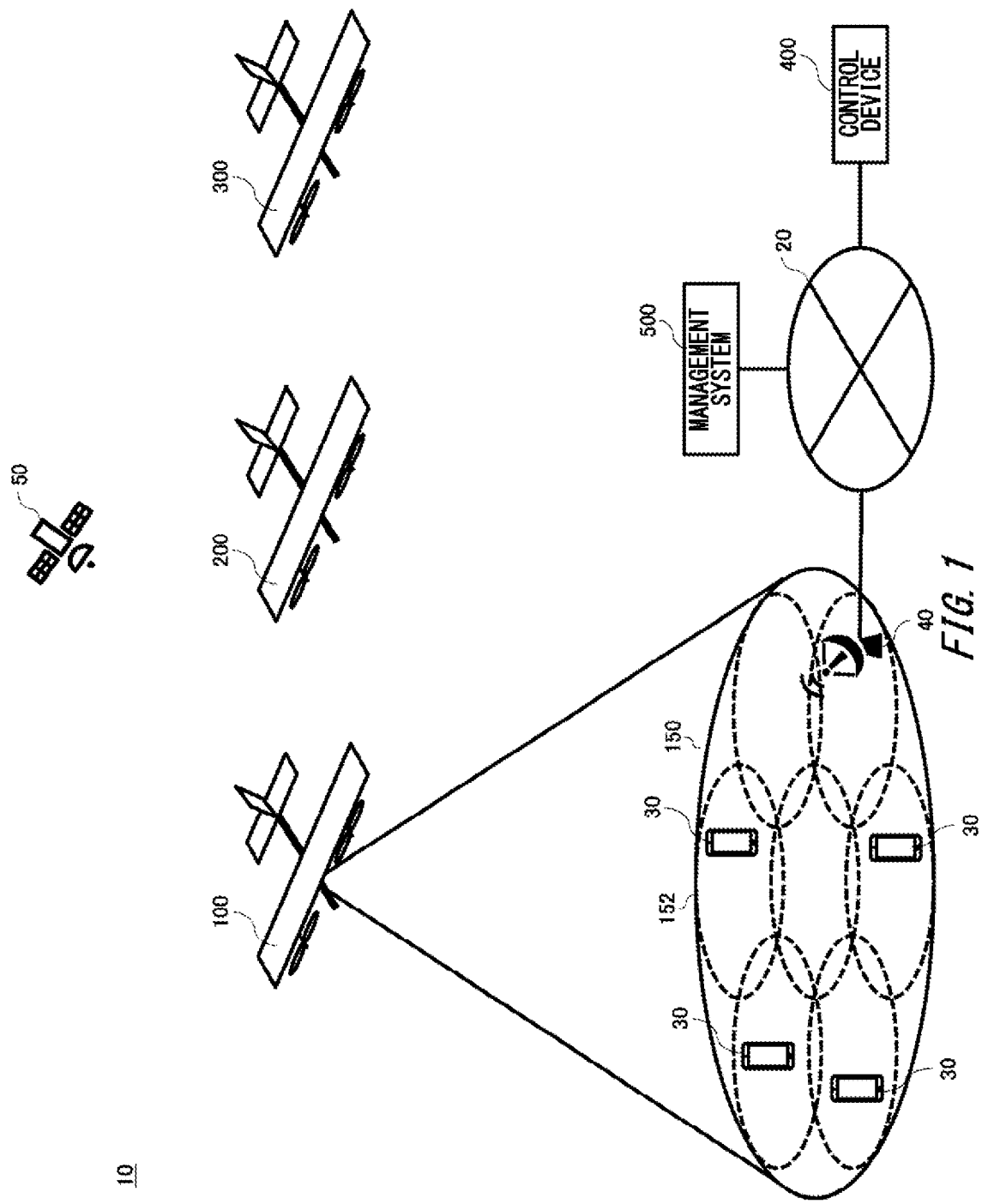
FIG. 1 schematically shows an example of a system 10.

FIG. 1 schematically shows an example of a system 10 of the present embodiment. The system 10 includes a plurality of flying bodies. The system 10 also includes a control apparatus 400. In FIG. 1, as the plurality of flying bodies, a flying body 100, a flying body 200 and a flying body 300 are exemplified. The plurality of flying bodies may also include a flying body other than the flying body 100, the flying body 200 and the flying body 300.

The flying body 100 is configured to form a communication area 150 by a beam irradiated toward the ground to provide wireless communication service for a user terminal 30 in the communication area 150. The communication area 150 may be formed on the ground, and the flying body 100 may be configured to provide wireless communication service for the user terminal 30 on the ground by the communication area 150. The communication area 150 may also be a three-dimensional communication area that also covers the sky. In a case where the communication area 150 is the three-dimensional communication area, the flying body 100 may also provide wireless communication service for the user terminal 30 such as a drone in the sky. The flying body 100 is configured to fly in the stratosphere to provide wireless communication service for the user terminals 30, for example. The flying body 100 may function as a stratosphere platform.

The user terminal 30 may be any communication terminal as long as it can communicate with the flying body 100. For example, the user terminal 30 is a mobile phone such as a smartphone. The user terminal 30 may also be a tablet terminal, a PC (Personal Computer) and the like. The user terminal 30 may also be a so-called IoT (Internet of Thing) device. Examples of the IoT device may include various sensors, various actuators and the like. The user terminal 30 may also be a communication module mounted on a vehicle, a ship, a drone and the like. The user terminal 30 may include all things corresponding to so-called IoE (Internet of Everything).

The flying body 100 may include a solar cell panel and a battery. The battery is configured to store electric power generated by the solar cell panel. The flying body 100 can fly by driving a thrust mechanism such as propellers with the electric power stored in the battery. The flying body 100 may also be configured to form the communication area 150 by the electric power stored in the battery.

The flying body 100 is configured to cover a ground area of a cover target by the communication area 150 while circling over the ground area, for example. The circling of the flying body 100 over the ground area may also be referred to as stationary flight. The flying body 100 is also configured to cover the entire ground area by moving over the ground area while covering a part of the ground area of a cover target by the communication area 150, for example.

The flying body 100 has an antenna for forming the communication area 150. The antenna may be, for example, a multi-beam antenna. The communication area 150 may be composed of a plurality of sub-cells 152. The communication area 150 may also be composed of a single cell.

The flying body 100 is configured to provide wireless communication service for the user terminal 30 by relaying communication between the user terminal 30 and a network 20 on the ground, for example. The network 20 may be any network, and may include, for example, at least any of the Internet, a mobile phone network such as so-called 3G (3rd Generation), LTE (Long Term Evolution), 4G (4th Generation) and 5G (5th Generation), an air wireless LAN (Local Area Network), and a dedicated network.

The flying body 100 is configured to communicate with the network 20 on the ground via a gateway 40 in the communication area 150 of gateways 40 arranged in each region on the ground, for example. The flying body 100 is also configured to communicate with the network 20 on the ground via a communication satellite 50, for example. In this case, the flying body 100 has an antenna for communicating with the communication satellite 50.

The flying body 100 is also configured to communicate with another flying body. The flying body 100 is configured to communicate with another flying body via the network 20, for example. The flying body 100 is also configured to communicate with another flying body via the communication satellite 50, for example.

The flying body 100 may also be configured to wirelessly communicate with another flying body. The flying body 100 may also be configured to directly communicate with another flying body by wireless communication. In this case, the flying body 100 has an antenna for wirelessly communicating with another flying body. The flying body 100 may also be configured to form a C2 link with another flying body by using the antenna, and to perform communication via the C2 link, for example.

The flying body 200 may have a similar configuration to the flying body 100. The flying body 200 may have a configuration that is partially different from the flying body 100. For example, the flying body 200 may be able to provide wireless communication service having a higher communication capacity than the wireless communication service by the flying body 100. In this case, the flying body 200 may be larger than the flying body 100, and have an antenna larger than the antenna of the flying body 100.

For example, the flying body 200 may also have an electric power supplying unit configured to supply electric power to another flying body. The flying body 200 may also have a thrust mechanism configured to generate a higher thrust force than the thrust mechanism mounted on the flying body 100, for example.

The flying body 300 may have a similar configuration to the flying body 100, like the flying body 200. The flying body 300 may also have a configuration that is partially different from the flying body 100, like the flying body 200.

The control apparatus 400 is configured to control a plurality of flying bodies. The control apparatus 400 is configured to control the plurality of flying bodies by transmitting an instruction to each of the plurality of flying bodies. The control apparatus 400 is configured to control the plurality of flying bodies so as to cause the communication area 150 to cover a communication area on the ground, for example.

The control apparatus 400 of the present embodiment is configured to control combination of the plurality of flying bodies. The control apparatus 400 is configured to select two or more flying bodies to be combined from the plurality of flying bodies and to combine the two or more flying bodies each other by transmitting a control signal to each of the selected two or more flying bodies, for example.

The control apparatus 400 is configured to select a flying body to be combined with the flying body 100 from the plurality of flying bodies and to control the selected flying body and the flying body 100 to be combined, for example. The control apparatus 400 is, for example, configured to monitor diverse situations relating to the flying body 100. When the situations satisfy a predetermined condition, the control apparatus 400 selects a flying body to be combined with the flying body 100, according to the satisfied condition.

For example, when a communication traffic of the wireless communication service provided by the flying body 100 exceeds a predetermined threshold value, the control apparatus 400 selects a flying body to be combined with the flying body 100. The control apparatus 400 is configured to select the flying body 200 having a similar configuration to the flying body 100, for example. The control apparatus 400 is also configured to select the flying body 200 that provides wireless communication service having a higher communication capacity than the wireless communication service by the flying body 100, for example. After combining the flying body 100 and the flying body 200, when a communication traffic of wireless communication service provided by the flying body 100 and the flying body 200 exceeds a predetermined threshold value, the control apparatus 400 may select a flying body to be additionally combined with the flying body 100 and the flying body 200. For example, the control apparatus 400 is configured to select the flying body 300 having a similar configuration to the flying body 100. The control apparatus 400 is also configured to select the flying body 300 that can provide wireless communication service having a higher communication capacity than the wireless communication service by the flying body 100, for example.

In addition, for example, when a remaining battery level of the battery of the flying body 100 is smaller than a predetermined threshold value, when an electric power generation amount by the solar cell panel is smaller than a predetermined threshold value, when a light-receiving amount by the solar cell panel is smaller than a predetermined threshold value, and the like, the control apparatus 400 selects a flying body to be combined with the flying body 100. For example, the control apparatus 400 is configured to select the flying body 200 having an electric power supplying unit.

In addition, for example, when an airstream velocity in a flight area of the flying body 100 is greater than a predetermined threshold value, the control apparatus 400 selects a flying body to be combined with the flying body 100. For example, the control apparatus 400 is configured to select the flying body 200 having a similar configuration to the flying body 100. The control apparatus 400 is also configured to select the flying body 200 having a thrust mechanism configured to generate a thrust force higher than the thrust mechanism mounted on the flying body 100, for example.

Note that, the control apparatus 400 may also be configured to select a flying body to be combined with the flying body 100, according to an operator's instruction. When the operator wants to enhance a communication function of the flying body 100, wants to increase an amount of electric power of the flying body 100, wants to increase the thrust force of the flying body 100, and the like, for example, the operator instructs a flying body to be combined with the flying body 100.

The control apparatus 400 may also be configured to monitor the situations relating to the plurality of flying bodies by continuously receiving information relating to each situation from each of the plurality of flying bodies. The information may include position information of the flying body. The information may also include a situation in the communication area formed by the flying body. The situation in the communication area is, for example, a communication traffic in the communication area, a size of the communication area, and the like. The information may also include a situation of the ground area that the flying body covers by the communication area. The situation of the ground area may include situations indicating whether the ground area is an urban area, whether the ground area is a rural area, whether the ground area is a super rural area, whether a wireless communication area on the ground exists in the ground area, and the like.

The control apparatus 400 may also be configured to monitor the situations relating to the plurality of flying bodies by continuously receiving information relating to situations of each of the plurality of flying bodies from a management system 500 configured to manage the plurality of flying bodies. The management system 500 is configured to continuously receive the information relating to situations of each of the flying bodies from each of the plurality of flying bodies via the gateway 40 and the network 20, for example. The management system 500 is also configured to continuously receive the information relating to situations of each of the flying bodies from each of the plurality of flying bodies via the communication satellite 50, for example. The management system 500 may include a plurality of devices each configured to collect a variety of information, or may include only one device configured to collect a variety of information.

Like a case functioning as a stratosphere platform, when providing wireless communication service in an ultra-wide area, it is necessary to increase a size of the flight body so as to operate the wireless communication service with one flying body, for example. This is because it is necessary to mount a large-sized antenna, which requires a thrust mechanism for flying with a large-sized antenna, and a large-sized solar cell panel and a large-sized battery and the like for supplying electric power to the large-sized antenna. However, the larger the flight body is, the more difficult it is to take off and to land and the more difficult it is to operate. This is because a large-sized landing field for a large-sized flying body is required and a large-sized hanger for accommodating a large-sized flying body is required.

In contrast, according to the system 10 of the present embodiment, the plurality of flying bodies can be combined with each other, and the control apparatus 400 controls the combination of the plurality of flying bodies depending on situations. By combining small-sized flying bodies each other, it is possible to provide a function equal to or higher than a large-sized flying body. That is, instead of using a large-sized flying body, a plurality of small-sized flying bodies is prepared and is combined with each other depending on situations, so that it is possible to provide wireless communication service in an ultra-wide area. Thereby, it is possible to downsize the flying body, and to facilitate takeoff and landing and operations of the flying body. By downsizing the flying body, it is also possible to enable takeoff by winch towing like a glider and to reduce consumption of the electric power. By downsizing the flying body, it is also possible to accommodate the flying body by a small-sized hanger and to easily prepare a temporary airfield. By downsizing the flying body, it is also possible to easily implement a flying body and a small-sized hanger in an assembling manner and to cause the flying body to fly faster on the site, in a situation such as disaster.

Figure 2:
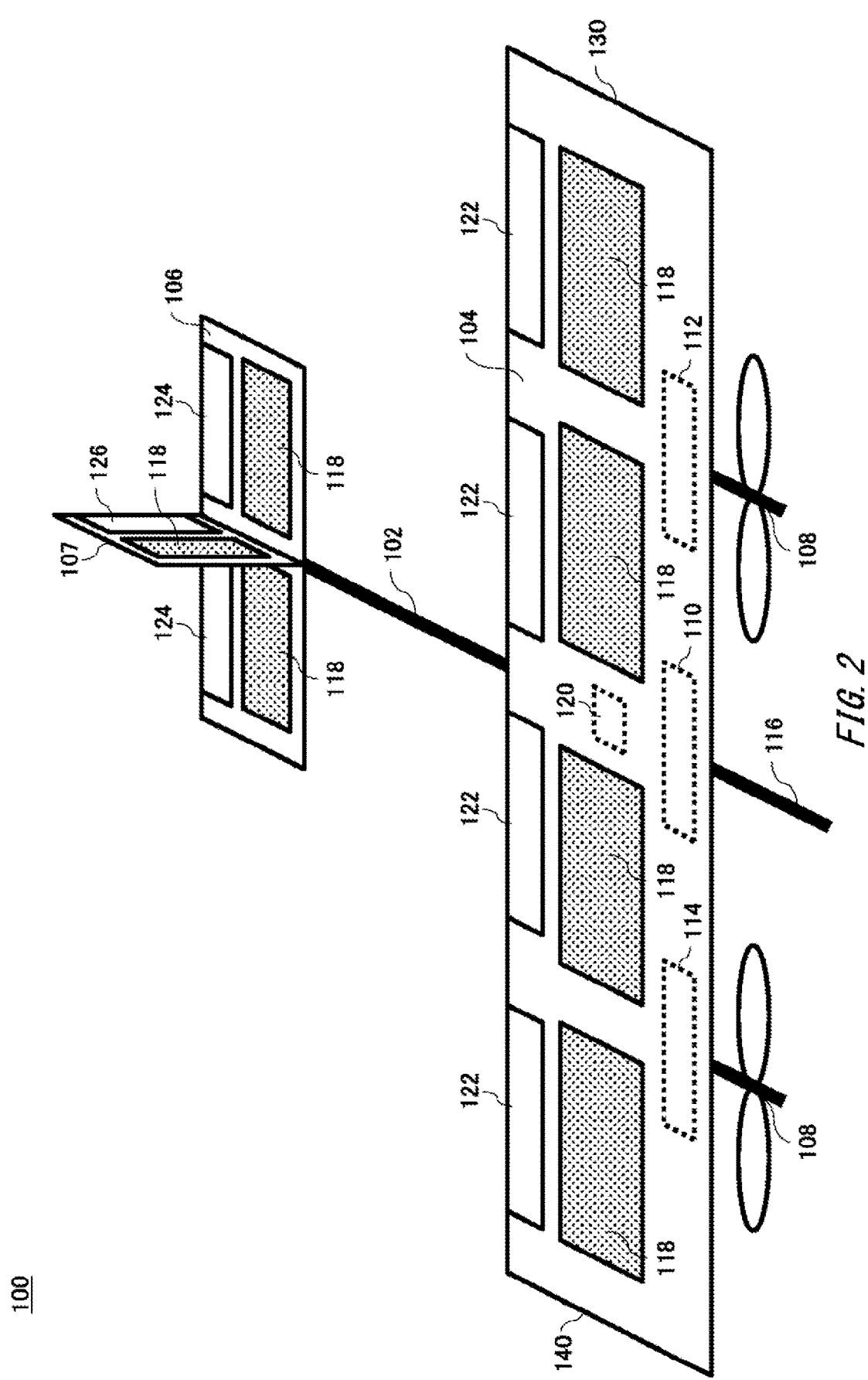
FIG. 2 schematically shows an example of a flying body 100.

FIG. 2 schematically shows an example of the flying body 100. The flying body 100 exemplified in FIG. 2 includes a main body 102, a main wing 104, a horizontal tail 106, a vertical tail 107, a plurality of propellers 108, a center antenna 110, a left wing-side antenna 112, a right wing-side antenna 114, a GPS transceiver 116, solar cell panels 118 and a battery 120.

The main wing 104 has movable wings 122. The horizontal tail 106 has movable wings 124. The vertical tail 107 has a movable wing 126. The solar cell panel 118 is provided on at least any of the main wing 104, the horizontal tail 106, and the vertical tail 107. FIG. 2 exemplifies a case where the solar cell panel 118 is provided on each of the main wing 104, the horizontal tail 106 and the vertical tail 107.

The movable wings 122 are provided on a rear edge of the main wing 104, and are used so as to tilt the airframe right and left. The movable wings 122 may also be so-called ailerons. The movable wings 124 are provided on a rear edge of the horizontal tail 106, and are used so at to move the nose up and down. The movable wings 124 may also be so-called elevators. The movable wing 126 is provided on a rear edge of the vertical tail 107, and is used so as to turn the nose right and left. The movable wing 126 may also be a so-called rudder. The flying body 100 is configured to control a position and a posture by controlling the propellers 108, the movable wings 122, the movable wings 124, and the movable wing 126.

The battery 120 is configured to store electric power generated by the solar cell panel 118. The flying body 100 can fly by driving the propellers 108, the movable wings 122, the movable wings 124, and the movable wing 126 with the electric power stored in the battery 120. Note that, the flying body 100 may have a fuel cell instead of the solar cell panel 118 and the battery 120. In this case, the flying body 100 can fly by driving the propellers 108 with electric power supplied from the fuel cell. As fuel, a variety of any fuels such as hydrogen and gasoline can be adopted. The flying body 100 may also have both the solar cell panel 118 and battery 120 and the fuel cell.

The propeller 108 may be an example of the thrust mechanism. The flying body 100 may have only one propeller 108 or a plurality of propellers 108. FIG. 2 exemplifies a case where the flying body 100 has the two propellers 108. The flying body 100 may also have a jet engine instead of the propellers 108. The jet engine may be an example of the thrust mechanism.

The center antenna 110, the left wing-side antenna 112 and the right wing-side antenna 114 are configured to form the communication area 150. The flying body 100 may have only some of the center antenna 110, the left wing-side antenna 112 and the right wing-side antenna 114. For example, the flying body 100 may have only the center antenna 110 of the center antenna 110, the left wing-side antenna 112, and the right wing-side antenna 114.

The GPS transceiver 116 is configured to receive a GPS signal. The flying body 100 may be configured to acquire position information of the flying body 100 by the GPS signal received by the GPS transceiver 116. The GPS transceiver 116 may be configured to specify a position of the flying body 100 by using the received GPS signal, and the flying body 100 may be configured to acquire the position information specified by the GPS transceiver 116.

The flying body 100 exemplified in FIG. 2 has an attachment/detachment part configured to physically attach to and detach from another flying body for combining with and separating from another flying body. The flying body 100 shown in FIG. 2 has a left wing-side attachment/detachment part 130 and a right wing-side attachment/detachment part 140. The left wing-side attachment/detachment part 130 is arranged on a left wing-side of the main wing 104. The left wing-side attachment/detachment part 130 is arranged at a tip end of the left wing of the main wing 104, for example. The right wing-side attachment/detachment part 140 is arranged on a right wing-side of the main wing 104. The right wing-side attachment/detachment part 140 is arranged at a tip end of the right wing of the main wing 104, for example.

As described above, the flying body 200 may have a similar configuration to the flying body 100 or may have a configuration that is partially different from the flying body 100. For example, the flying body 200 includes an electric power supplying unit configured to supply the electric power of the battery 120 to another flying body. In this case, the battery provided to the flying body 200 may have a larger capacity than the battery 120 of the flying body 100. The electric power generation amount of the solar cell panel provided to the flying body 200 may be also larger than the solar cell panel 118 of the flying body 100. The flying body 200 may not have an antenna for forming the communication area 150. That is, the flying body 200 may be a flying body for electric power replenishment for replenishing electric power to another flying body.

For example, the flying body 200 may also have a center antenna, a left wing-side antenna, and a right wing-side antenna larger than the center antenna 110, the left wing-side antenna 112, and the right wing-side antenna 114. The flying body 200 may also have more antennas than the flying body 100, as antennas for forming a communication area. That is, the flying body 200 may also be a flying body for communication function enhancement.

The flying body 200 also has a propeller configured to generate a thrust force higher than the propeller 108 of the flying body 100, for example. For example, the flying body 200 has a propeller having a higher-output motor than a motor of the propeller 108 of the flying body 100. The flying body 200 may also have more propellers than the flying body 100, for example. In this case, the flying body 200 may not have an antenna for forming the communication area 150. That is, the flying body 200 may be a flying body for thrust force enhancement for enhancing a thrust force of another flying body.

Figure 3:
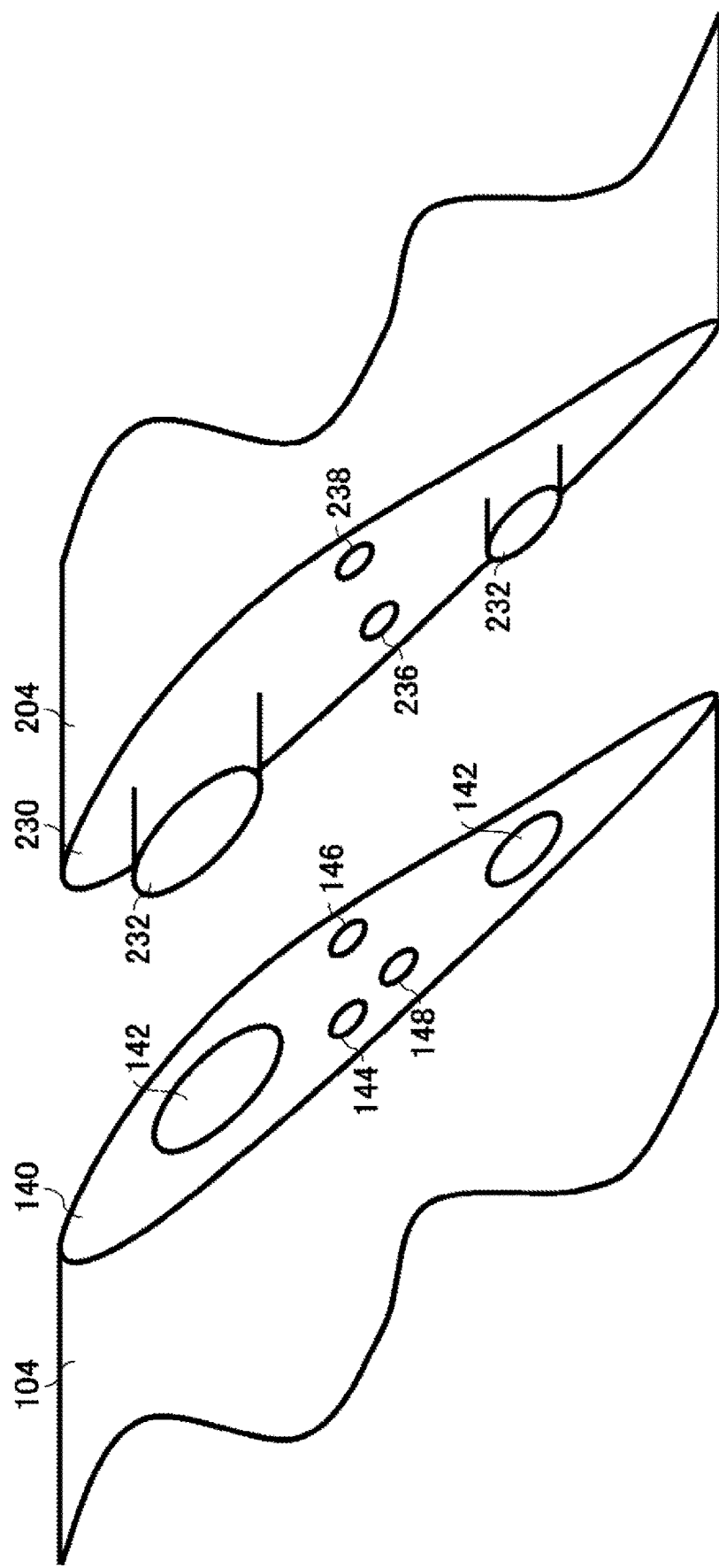
FIG. 3 schematically shows an example of a right wing-side attachment/detachment part 140.

FIG. 3 schematically shows an example of the right wing-side attachment/detachment part 140 of the flying body 100. In FIG. 3, a left wing-side attachment/detachment part 230 of the flying body 200 is also shown so as to illustrate connection with another flying body. The left wing-side attachment/detachment part 230 of the flying body 200 has a similar configuration to the left wing-side attachment/detachment part 130 of the flying body 100.

The right wing-side attachment/detachment part 140 has structural concave connection portions 142, a position measuring sensor 144, a signal connection portion 146, and an electric power connection portion 148. The left wing-side attachment/detachment part 230 has structural convex connection portions 232, a signal connection portion 236 and an electric power connection portion 238.

The structural concave connection portions 142 each have a fitting structure with the structural convex connection portions 232. FIG. 3 exemplifies the two structural concave connection portions 142. However, the number of the structural concave connection portions 142 is not limited thereto. The convex and concave relation may be reversed between the right wing-side attachment/detachment part 140 and the left wing-side attachment/detachment part 230.

The position measuring sensor 144 is configured to measure a position of an object facing the position measuring sensor 144. A type of the position measuring sensor 144 may be any type such as a laser type, an ultrasonic type, an infrared type and the like. The position measuring sensor 144 may also be arranged on both the right wing-side attachment/detachment part 140 and the left wing-side attachment/detachment part 130.

The signal connection portion 146 is connected to the signal connection portion 236 when the structural concave connection portions 142 and the structural convex connection portions 232 are fitted. The flying body 100 can transmit and receive a signal to and from the flying body 200 via the signal connection portion 146.

The electric power connection portion 148 is connected to the electric power connection portion 238 when the structural concave connection portions 142 and the structural convex connection portions 232 are fitted. The flying body 100 can perform electric power transmission with the flying body 200 via the electric power connection portion 148.

Note that, the flying body 100 may also have a fuel pipe instead of the electric power connection portion 148. The fuel pipe may be connected to a fuel pipe arranged on the left wing-side attachment/detachment part 230 when the structural concave connection portions 142 and the structural convex connection portions 232 are fitted. The flying body 100 can supply and receive fuel to and from the flying body 200 via the fuel pipe.

Figure 4:
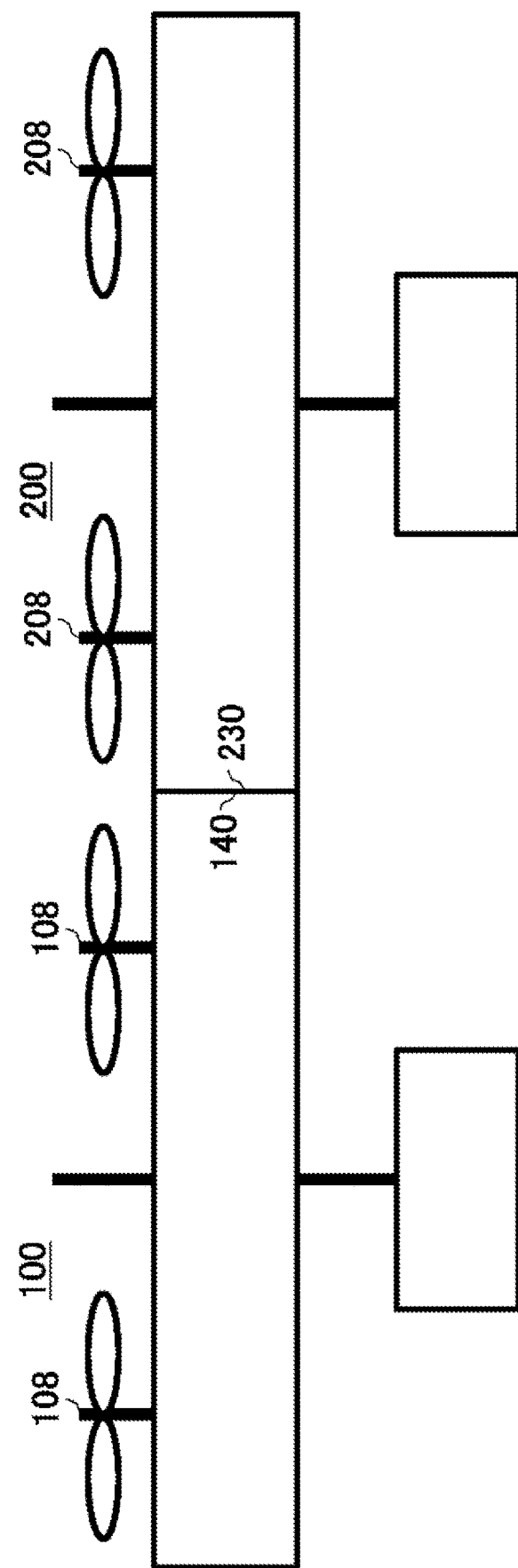
FIG. 4 schematically shows an example of the flying body 100 combined with a flying body 200.

FIG. 4 schematically shows an example of the flying body 100 combined with the flying body 200. Here, a case where the right wing-side attachment/detachment part 140 of the flying body 100 and the left wing-side attachment/detachment part 230 of the flying body 200 are connected to combine the flying body 100 and the flying body 200 is exemplified.

The flying body 100 can perform electric power transmission with the flying body 200 by combining with the flying body 200. For example, the flying body 100 receives electric power from the flying body 200. The flying body 100 also supplies electric power to the flying body 200, for example.

In a case where the flying body 100 and the flying body 200 each have a fuel tank, the flying body 100 can supply and receive fuel to and from the flying body 200 by combining with the flying body 200 to. For example, the flying body 100 receives fuel from the flying body 200. The flying body 100 also supplies fuel to the flying body 200, for example.

The flying body 100 can also receive and supply the thrust force from and to the flying body 200 by combining with the flying body 200.

The flying body 100 can also form a communication area in cooperation with the flying body 200 by combining with the flying body 200. Thereby, as compared to a case where the communication area is formed only with the flying body 100, it is possible to increase the communication capacity, to widen the communication area and to increase directionality.

For example, when a communication situation in the communication area 150 formed by the flying body 100 satisfies a predetermined condition, the control apparatus 400 transmits a control signal for combination with the flying body 200 to the flying body 100. As a specific example, when a communication traffic in the communication area 150 formed by the flying body 100 is higher than a predetermined threshold value, the control apparatus 400 transmits a control signal for combination with the flying body 200 to the flying body 100. By combining the flying body 100 and the flying body 200, it is possible to increase the communication capacity and to appropriately cope with an increase in communication traffic. The control apparatus 400 may be configured to select, as a combination target with the flying body 100, the flying body 200 having a similar configuration to the flying body 100. The control apparatus 400 may also be configured to select, as a combination target with the flying body 100, the flying body 200 that can provide wireless communication service having a higher communication capacity than wireless communication service by the flying body 100. Thereby, it is possible to increase the communication capacity more efficiently.

For example, when a latitude of the flying body 100 satisfies a predetermined condition, the control apparatus 400 transmits a control signal for combination with the flying body 200 to the flying body 100. As a specific example, when the latitude of the flying body 100 is higher than a predetermined latitude, the control apparatus 400 transmits a control signal for combination with the flying body 200 to the flying body 100. By combining the flying body 100 and the flying body 200, it is possible to supply electric power from the flying body 200 to the flying body 100, and when the flying body 100 moves to a high-latitude region where the electric power generation amount by the solar cell panel 118 is reduced, it is possible to appropriately replenish electric power to the flying body 100. The control apparatus 400 may also be configured to select, as a combination target with the flying body 100, the flying body 200 having an electric power supplying unit. The control apparatus 400 may also be configured to select, as a combination target with the flying body 100, the flying body 200 having an electric power supplying unit and a remaining battery level larger than a predetermined threshold value.

For example, when a weather situation in a flight area of the flying body 100 satisfies a predetermined condition, the control apparatus 400 transmits a control signal for combination with the flying body 200 to the flying body 100. As a specific example, when an airstream velocity in the flight area of the flying body 100 is higher than a predetermined threshold value, the control apparatus 400 transmits a control signal for combination with the flying body 200 to the flying body 100. By combining the flying body 100 and the flying body 200, it is possible to provide the thrust force of the flying body 200 to the flying body 100 and to support flying against the airstream. The control apparatus 400 may be configured to select, as a combination target with the flying body 100, the flying body 200 having a similar configuration to the flying body 100. The control apparatus 400 may also be configured to select the flying body 200 having a thrust mechanism configured to generate a thrust force higher than the thrust mechanism of the flying body 100. Thereby, it is possible to provide the higher thrust force to the flying body 100.

After the flying body 100 and the flying body 200 combine with each other, at least any of the plurality of propellers 108 of the flying body 100 and the plurality of propellers 208 of the flying body 200 may be stopped. For example, the flying body 100 stops the propeller 108 of the left wing-side, and the flying body 200 stops the propeller 208 of the right wing-side. In addition, for example, the flying body 100 stops the propeller 108 of the right wing-side, and the flying body 200 stops the propeller 208 of the left wing-side. Thereby, while balancing the thrust force, it is possible to appropriately reduce the power consumption of the flying body 100 and the flying body 200. The stop of the propellers may be executed independently by the flying body 100 and the flying body 200 or may be executed by the flying body 100 and the flying body 200 according to the control by the control apparatus 400.

Figure 5:
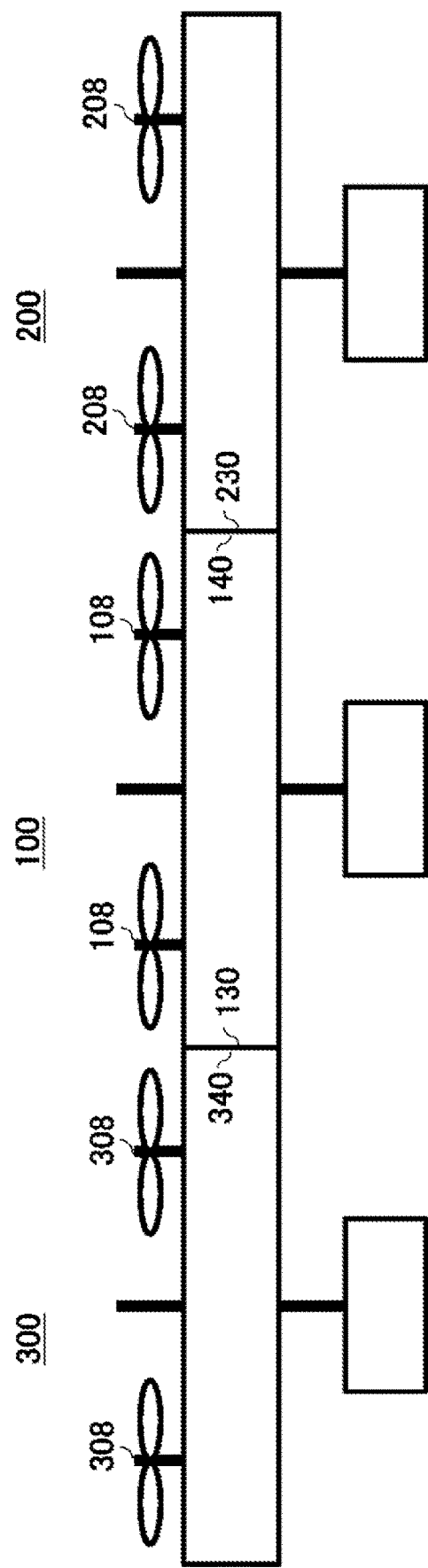
FIG. 5 schematically shows an example of the flying body 100 combined with the flying body 200 and a flying body 300.

FIG. 5 schematically shows an example of the flying body 100 combined with the flying body 200 and a flying body 300. FIG. 5 exemplifies a case where the flying body 200 and the flying body 300 are combined on both sides of the flying body 100. However, the present invention is not limited thereto. For example, the flying body 100 and the flying body 200 may be combined and the flying body 200 and the flying body 300 may be combined, so that the flying body 100, the flying body 200 and the flying body 300 may be combined.

The flying body 200 may be a flying body having a similar configuration to the flying body 100. The flying body 200 may also be a flying body for electric power replenishment. The flying body 200 may also be a flying body for thrust force enhancement. The flying body 200 may also be a flying body for communication function enhancement.

The flying body 300 may be a flying body having a similar configuration to the flying body 100. The flying body 300 may also be a flying body for electric power replenishment. The flying body 300 may also be a flying body for thrust force enhancement. The flying body 300 may also be a flying body for communication function enhancement.

For example, by combining the flying body 200 and the flying body 300 each having a similar configuration to the flying body 100 with the flying body 100, it is possible to increase an amount of electric power supply, an amount of fuel supply, a communication capacity, and a thrust force that can be provided to the flying body 100, as compared to a case where only the flying body 200 is combined.

In addition, for example, by combining the flying body 200 for electric power replenishment and the flying body 300 for thrust force enhancement with the flying body 100, it is possible to effectively perform electric power replenishment and thrust force enhancement with respect to the flying body 100.

Furthermore, for example, by combining the flying body 300 for thrust force enhancement between the flying body 100 and the flying body 200 having a similar configuration to the flying body 100, it is possible to effectively apply the thrust force to both the flying body 100 and the flying body 200.

After the flying body 100, the flying body 200 and the flying body 300 combine, at least any of the plurality of propellers 108 of the flying body 100, the plurality of propellers 208 of the flying body 200 and a plurality of propellers 308 of the flying body 300 may be stopped. For example, the plurality of propellers 108 of the flying body 100 may be stopped. In addition, for example, the propeller 208 on the right wing-side of the flying body 200 and the propeller 308 on the left wing-side of the flying body 300 may be stopped. Furthermore, for example, the plurality of propellers 208 of the flying body 200 and the plurality of propellers 308 of the flying body 300 may be stopped.

Figure 6:
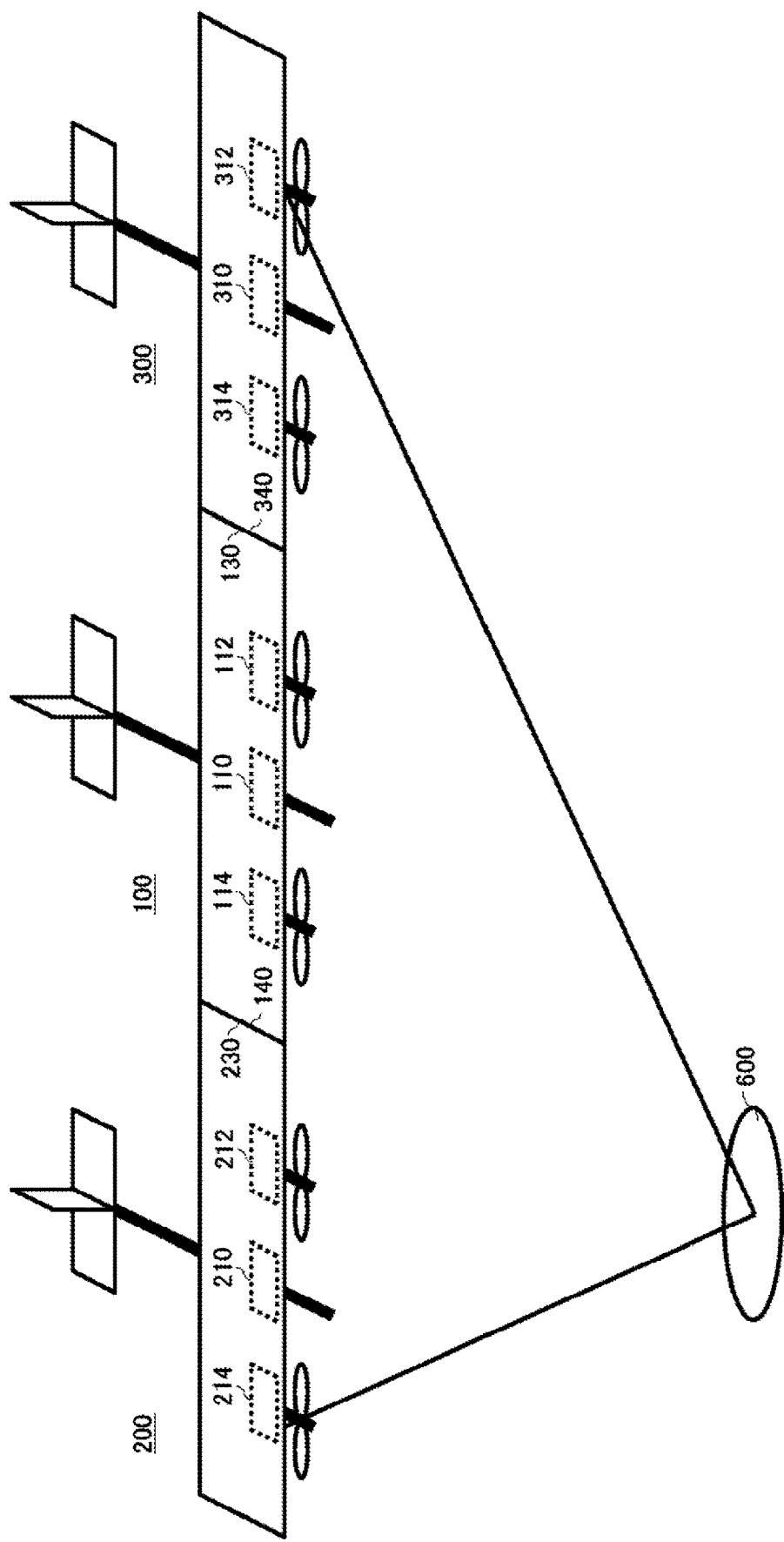
FIG. 6 schematically shows an example of a communication area 600 formed by the flying body 100, the flying body 200 and the flying body 300.

FIG. 6 schematically shows an example of a communication area 600 formed by the flying body 100, the flying body 200 and the flying body 300. Here, a case where the flying body 100 has the center antenna 110, the left wing-side antenna 112 and the right wing-side antenna 114, the flying body 200 has the center antenna 210, the left wing-side antenna 212 and the right wing-side antenna 214, and the flying body 300 has a center antenna 310, a left wing-side antenna 312 and a right wing-side antenna 314 is exemplified.

The flying body 100 may form a communication area 600 by beam-forming by the center antenna 110, the left wing-side antenna 112, the right wing-side antenna 114, the center antenna 210, the left wing-side antenna 212, the right wing-side antenna 214, the center antenna 310, the left wing-side antenna 312, and the right wing-side antenna 314. Thereby, as compared to a case where the communication area is formed only by the flying body 100, it is possible to increase the number of the antennas, thereby increasing the communication capacity and directionality.

In the above embodiment, the example where the plurality of flying bodies is combined in the horizontal direction has been described. However, the present invention is not limited thereto. The plurality of flying bodies may also be combined in a vertical direction. The plurality of flying bodies may also be combined in an oblique direction. Each of the plurality of flying bodies may also be combined only in the horizontal direction, only in the vertical direction or only in the oblique direction. Each of the plurality of flying bodies may also be combined in multiple directions of the horizontal direction, the vertical direction, and the oblique direction. That is, each of the plurality of flying bodies may be combined with another flying body in the horizontal direction, in the vertical direction or in the oblique direction, depending on situations.

Figure 7:
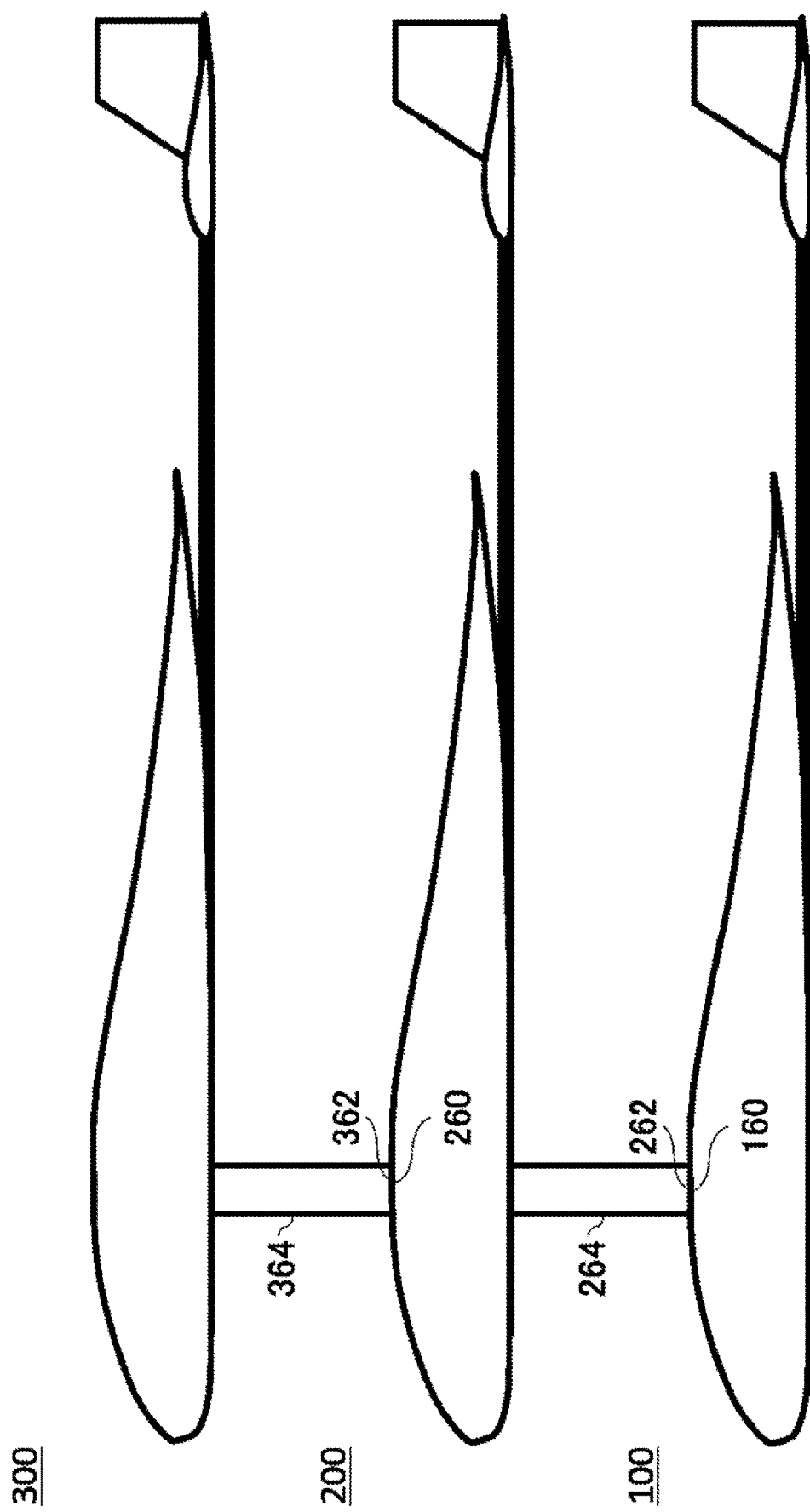
FIG. 7 schematically shows an example of the flying body 100, the flying body 200 and the flying body 300 combined in a vertical direction.

FIG. 7 schematically shows an example of the flying body 100, the flying body 200 and the flying body 300 combined in the vertical direction. In the example of FIG. 7, the flying body 100 has an upper surface-side attachment/detachment part 160 arranged on an upper surface-side of the flying body 100. The flying body 200 has an upper surface-side attachment/detachment part 260 arranged on an upper surface-side of the flying body 200 and a connection part 264 arranged on a lower surface-side of the flying body 200. The connection part 264 may also be accommodated on the lower surface-side of the flying body 200. A lower surface-side attachment/detachment part 262 is arranged at a tip end of the connection part 264. The flying body 300 has a connection part 364 arranged on a lower surface-side of the flying body 300. The connection part 364 may also be accommodated on the lower surface-side of the flying body 300. A lower surface-side attachment/detachment part 362 is arranged at a tip end of the connection part 364.

When the flying body 100 and the flying body 200 combine each other, at least any of the flying body 100 and the flying body 200 may adjust a positional relation between the upper surface-side attachment/detachment part 160 and the lower surface-side attachment/detachment part 262 to connect the upper surface-side attachment/detachment part 160 and the lower surface-side attachment/detachment part 262 each other. The upper surface-side attachment/detachment part 160 may have structural concave connection portions, a position measuring sensor, a signal connection portion, and an electric power connection portion, similarly to the right wing-side attachment/detachment part 140. The lower surface-side attachment/detachment part 262 may have structural convex connection portions, a signal connection portion, and an electric power connection portion, similarly to the left wing-side attachment/detachment part 230. The flying body 100 and the flying body 200 may perform communication and electric power transmission via the upper surface-side attachment/detachment part 160 and the lower surface-side attachment/detachment part 262. The flying body 100 and the flying body 200 may also supply and receive fuel via the upper surface-side attachment/detachment part 160 and the lower surface-side attachment/detachment part 262. As compared to the case where the attachment/detachment part is arranged at the tip end of the main wing 104, as shown in FIG. 3, when the attachment/detachment part is arranged on the upper surface or lower surface, it is possible to increase a contact area of the attachment/detachment part, so that it is possible to replenish fuel more promptly. The combining of the flying body 200 and the flying body 300 may be similar to the combining of the flying body 100 and the flying body 200.

The flying body 100 may have a connection part (not shown) arranged on the lower surface-side of the flying body 100. The lower surface-side attachment/detachment part is arranged at a tip end of the connection part. The flying body 300 may also have an upper surface-side attachment/detachment part (not shown) arranged on the upper surface-side of the flying body 300.

Note that, FIG. 7 shows the example where the connection part is arranged on the lower surface-side of the flying body so that the flying body 200 has the connection part 264 on the lower surface-side of the flying body 200. However, the present invention is not limited thereto. The connection part may also be arranged on the upper surface-side of the flying body. The connection part may also be each arranged on both the upper surface-side and the lower surface-side of the flying body. In this case, the connection part on the lower surface-side of the upper flying body and the connection part on the upper surface-side of the lower flying body attach and detach with respect to each other, so that the upper flying body and the lower flying body are combined and separated.

In a case where the flying body 100, the flying body 200 and the flying body 300 are combined in the vertical direction, the flying body 100, the flying body 200 and the flying body 300 may share a communication partner. In the example of FIG. 7, for example, the flying body 100 may communicate with the ground, the flying body 200 may wirelessly communicate with other flying bodies, and the flying body 300 may communicate with a communication satellite. Thereby, the flying body 100, the flying body 200 and the flying body 300 can communicate with a communication partner without interfering with each other. Note that, in this case, the flying body 100 may not have a function of wirelessly communicating with another flying body and a function of communicating with a communication satellite. The flying body 200 may not have a function of communicating with the ground and a function of communicating with a communication satellite. The flying body 300 may not have a function of communicating with the ground and a function of wirelessly communicating with another flying body. Thereby, it is possible to simplify and downsize the configuration of each of the flying body 100, the flying body 200 and the flying body 300.

Figure 8:
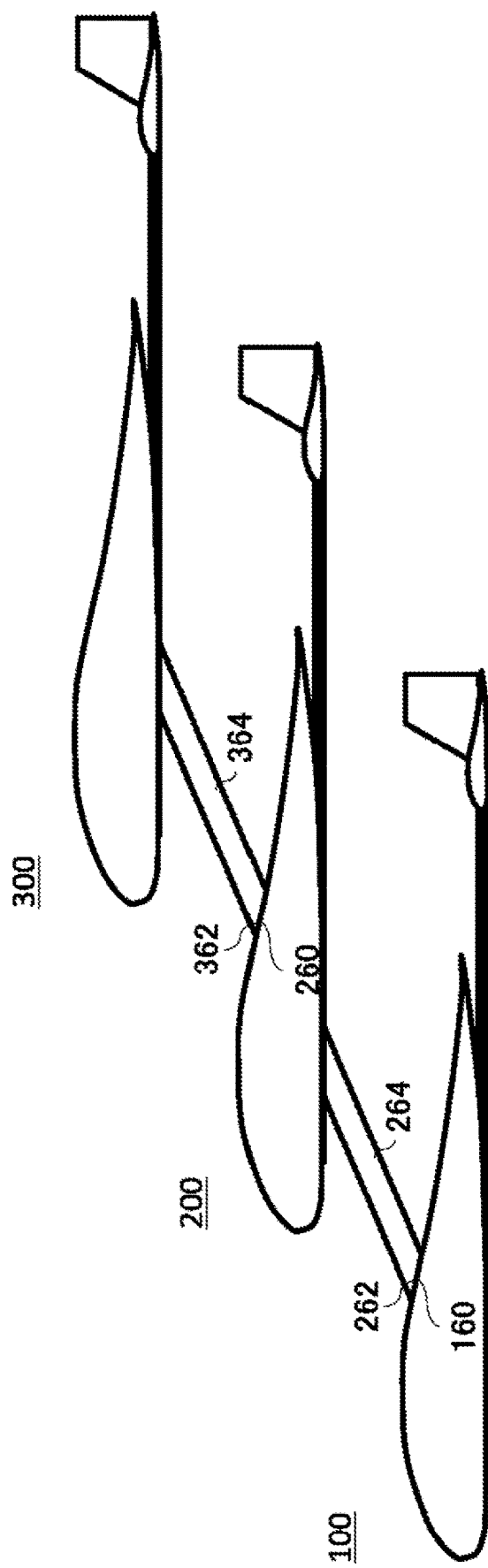
FIG. 8 schematically shows an example of the flying body 100, the flying body 200 and the flying body 300 combined in an oblique direction.

FIG. 8 schematically shows an example of the flying body 100, the flying body 200 and the flying body 300 combined in an oblique direction. Here, differences from FIG. 7 are mainly described.

The connection part 264 protrudes ahead of the flying body 200 from the lower surface-side of the flying body 200. The connection part 364 protrudes ahead of the flying body 300 from the lower surface-side of the flying body 300. That is, in a case where a connection part is arranged on a lower surface-side of a flying body, the connection part may protrude ahead of the flying body from the lower surface-side of the flying body. In addition, for example, in a case where a connection part is arranged on an upper surface-side of a flying body, the connection part may protrude from the upper surface-side of the flying body toward the rear of the flying body. By the above structure, it is possible to arrange the lower flying body at the front and the upper flying body at the rear, so that it is possible to reduce an air resistance, as compared to the case where the flying bodies are combined in the vertical direction, as shown in FIG. 7. Note that, an angle of the connection part relative to the flying body can be changed.

Figure 9:
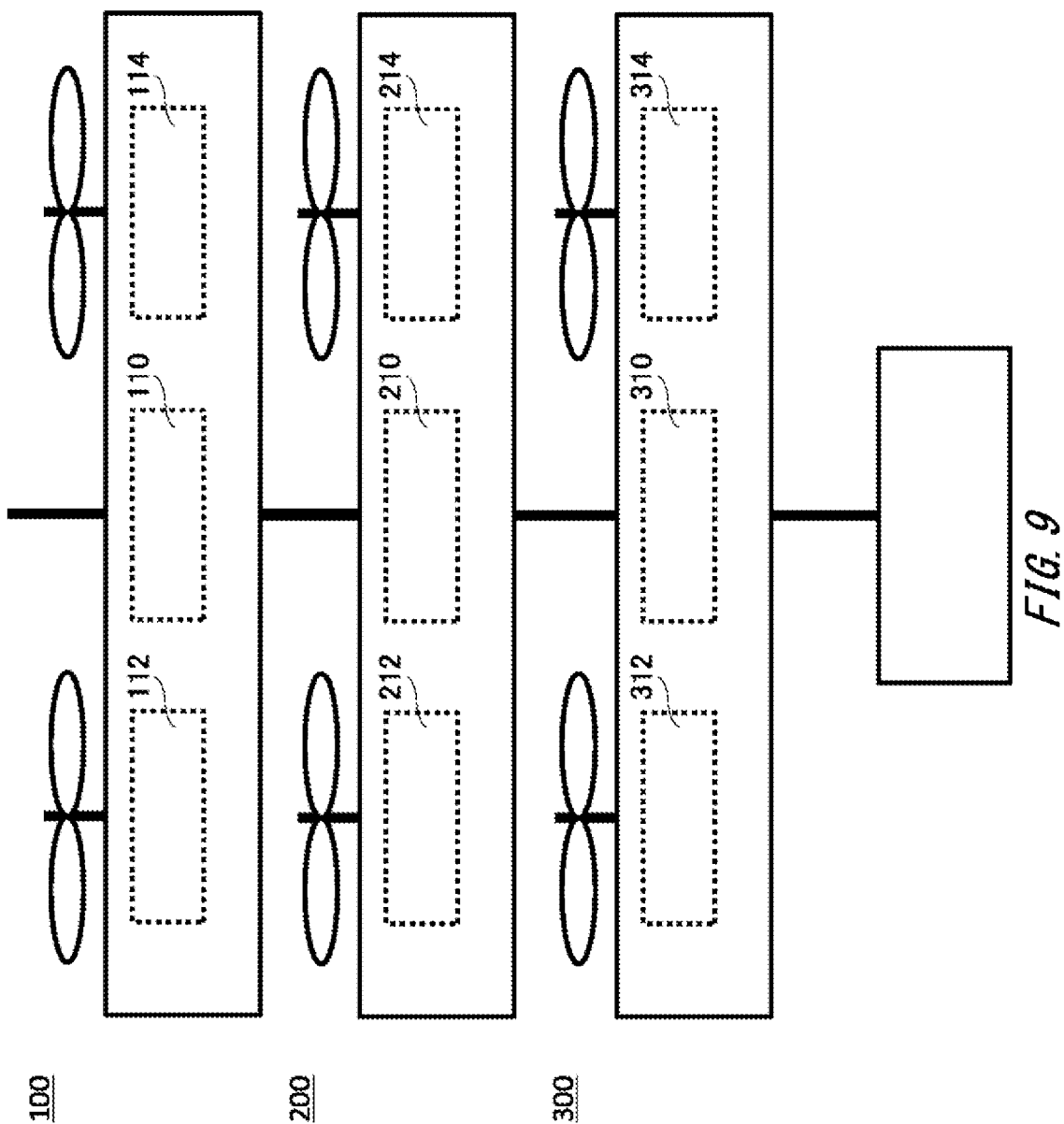
FIG. 9 schematically shows an example of the flying body 100, the flying body 200 and the flying body 300 combined in the oblique direction.

FIG. 9 schematically shows an example of the flying body 100, the flying body 200 and the flying body 300 combined in the oblique direction. FIG. 9 exemplifies a case where the flying body 100, the flying body 200 and the flying body 300 are seen from above.

The flying body 100, the flying body 200 and the flying body 300 are combined in the oblique direction, so that the center antenna 110, the left wing-side antenna 112, the right wing-side antenna 114, the center antenna 210, the left wing-side antenna 212, the right wing-side antenna 214, the center antenna 310, the left wing-side antenna 312, and the right wing-side antenna 314 can be arranged two-dimensionally. The flying body 100 may execute two-dimensional beam-forming by using the center antenna 110, the left wing-side antenna 112, the right wing-side antenna 114, the center antenna 210, the left wing-side antenna 212, the right wing-side antenna 214, the center antenna 310, the left wing-side antenna 312, and the right wing-side antenna 314 arranged two-dimensionally. Thereby, it is possible to increase a degree of formation freedom of the communication area and the directionality.

Figure 10:
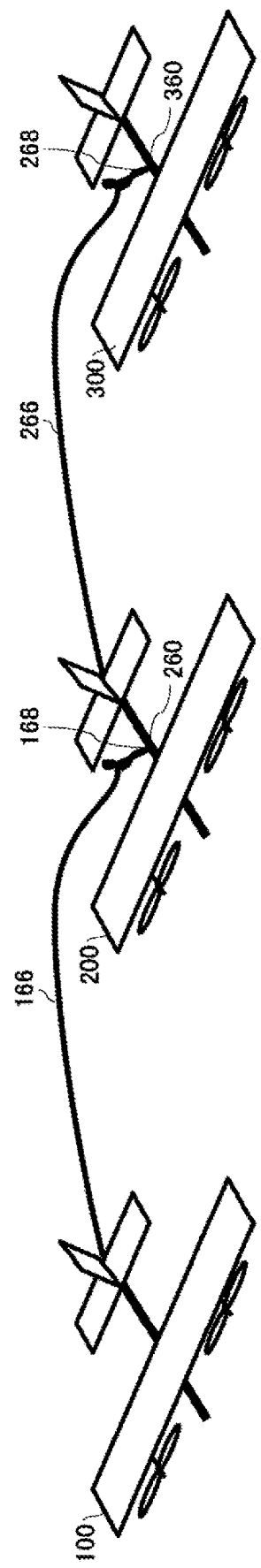
FIG. 10 schematically shows an example of the flying body 100, the flying body 200 and the flying body 300 combined by cables.

FIG. 10 schematically shows an example of the flying body 100, the flying body 200 and the flying body 300 combined by cables. As shown in FIG. 10, the flying body 100, the flying body 200 and the flying body 300 may be combined via cables.

In the example of FIG. 10, the flying body 100 has a cable 166 having an attachment/detachment part 168 that physically attaches to and detaches from another flying body. The flying body 200 has a cable 266 having an attachment/detachment part 268 that physically attaches to and detaches from another flying body, and an upper surface-side attachment/detachment part 260 arranged on the upper surface-side of the flying body 200. The flying body 300 has an upper surface-side attachment/detachment part 360 arranged on the upper surface-side of the flying body 300. Note that, the flying body 100 may also have an upper surface-side attachment/detachment part similar to the upper surface-side attachment/detachment part 260 of the flying body 200. The flying body 300 may also have a cable similar to the cable 166 of the flying body 100.

When the flying body 100 and the flying body 200 combine, for example, the flying body 200 may adjust a positional relation between the upper surface-side attachment/detachment part 260 and the attachment/detachment part 168 to connect the upper surface-side attachment/detachment part 260 and the attachment/detachment part 168 each other. In addition, for example, the flying body 100 can accommodate the cable 166 in a reel manner, and in an accommodated state, the flying body 100 may come close to the flying body 200 to connect the attachment/detachment part 168 to the upper surface-side attachment/detachment part 260 and then the flying body 100 may separate from the flying body 200 to connect the attachment/detachment part 168 and the upper surface-side attachment/detachment part 260.

The attachment/detachment part 168 may have structural concave connection portions, a position measuring sensor, a signal connection portion, and an electric power connection portion, similarly to the right wing-side attachment/detachment part 140. The upper surface-side attachment/detachment part 260 may have structural convex connection portions, a signal connection portion, and an electric power connection portion, similarly to the left wing-side attachment/detachment part 230. The flying body 100 may include a cable communication unit configured to communicate with the flying body 200 via the cable 166. The flying body 100 may also include an electric power transmission unit configured to transmit electric power with the flying body 200 via the cable 166. The flying body 100 may also include a fuel supplying and receiving unit configured to supply and receive fuel to and from the flying body 200 via the cable 166.

The combining of the flying body 200 and the flying body 300 may be similar to the combining of the flying body 100 and the flying body 200.

Figure 11:
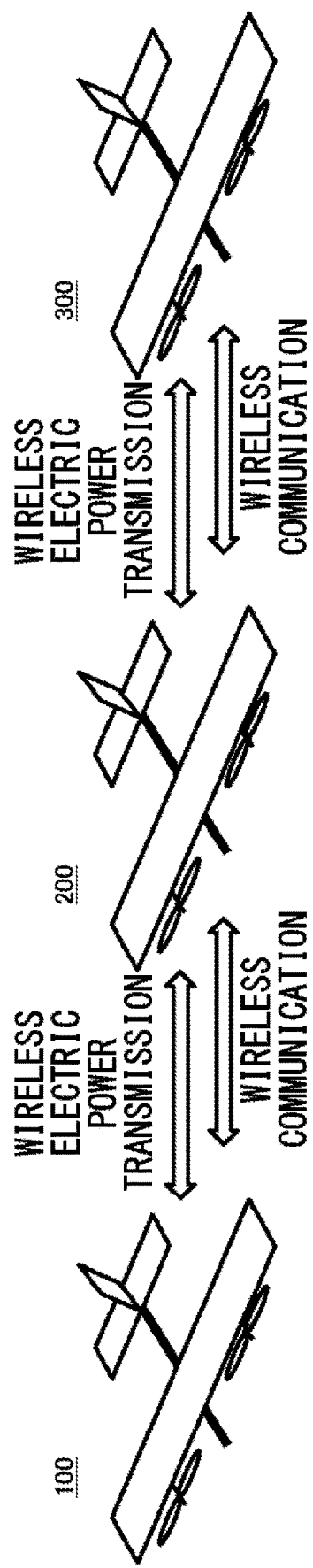
FIG. 11 schematically shows an example of the flying body 100, the flying body 200 and the flying body 300 combined virtually.

FIG. 11 schematically shows an example of the flying body 100, the flying body 200 and the flying body 300 combined virtually. Here, the description "the flying bodies are virtually combined" means a state where the flying bodies are not physically combined and wireless communication and wireless electric power transmission can be performed.

In the example of FIG. 11, the flying body 100, the flying body 200 and the flying body 300 each have a wireless communication unit configured to wirelessly communicate with another flying body and an electric power transmission execution unit configured to execute wireless electric power transmission with another flying body.

The wireless communication unit may be configured to perform wireless communication by a communication method that is used for so-called V2V. For example, the wireless communication unit is configured to perform wireless communication by beam-forming. The electric power transmission execution unit may be configured to perform wireless electric power transmission by any method such as an electromagnetic induction method.

By combining virtually the plurality of flying bodies, it is possible to omit the physical combining part such as the attachment/detachment part, and to implement substantially the same function as the case where the plurality of flying bodies is combined.

The flying body 100 combines virtually with another flying body of a type that is the same as or different from the flying body 100 and has an interface capable of performing wireless communication with the wireless communication unit by the wireless communication unit and the electric power transmission execution unit and executing wireless electric power transmission with the electric power transmission execution unit. That is, the flying body 100 can combine virtually with a flying body of a different type as long as the flying body has a common interface.

The flying body 100 combines virtually with the flying body 200, the flying body 300 and the like each having a wireless communication unit and an electric power transmission execution unit, for example. The flying body 100 combines virtually with a flying body of a flying balloon type, a flying body of an airship type, a flying body of a rotary wing type and the like, which each has an interface capable of performing wireless communication with the wireless communication unit of the flying body 100 and executing wireless electric power transmission with the electric power transmission execution unit of the flying body 100, for example. When the interface becomes common and open, it is possible to virtually combine and operate the plurality of flying bodies as one flying body without depending on the type of the flying body and makers. In addition, it is possible to change an operating method for each of diverse formations by the virtual combination. It is possible to perform a consolidated operation in operating devices for flying body and communication service, for example.

Figure 12:
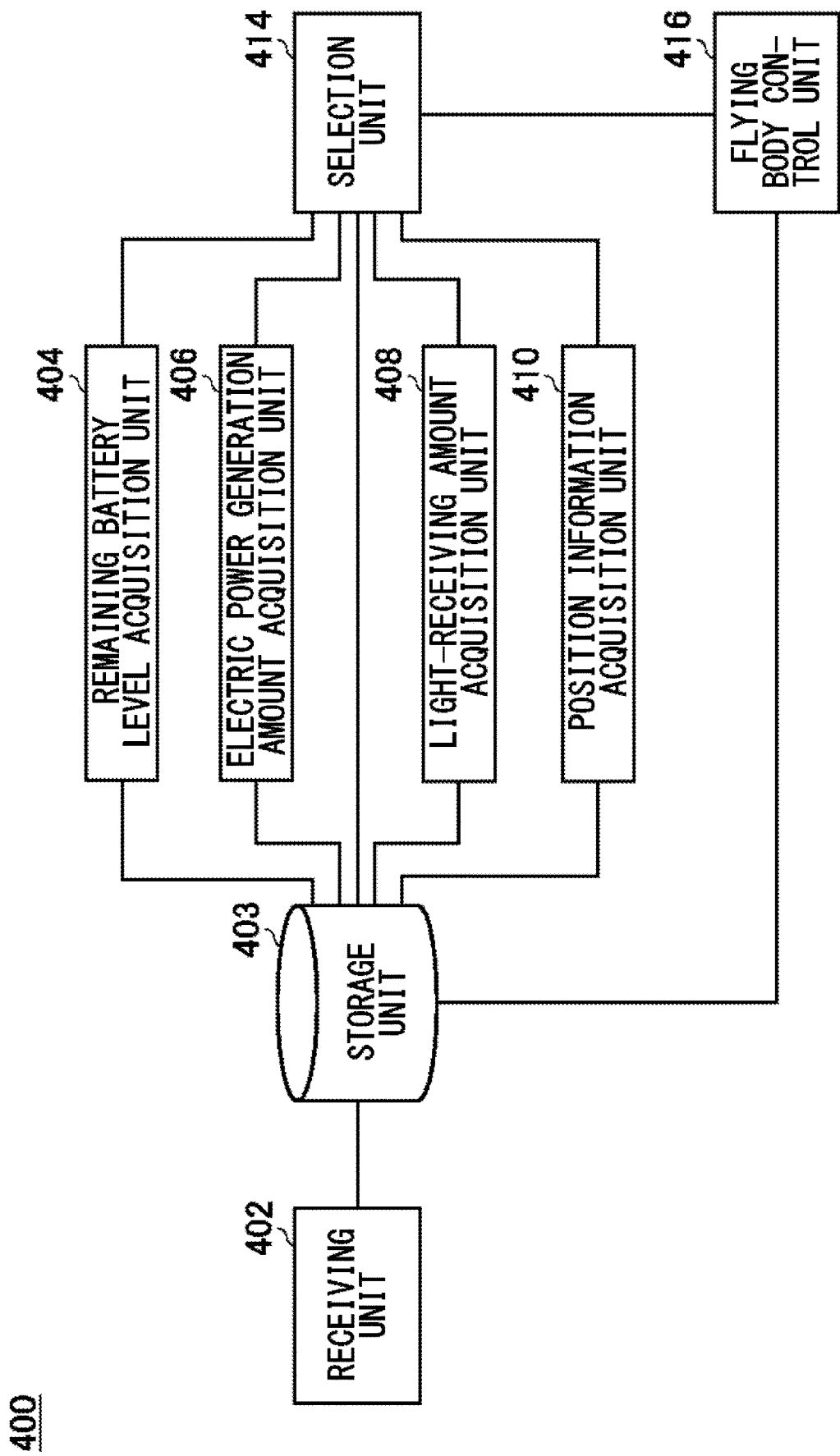
FIG. 12 schematically shows an example of a functional configuration of a control apparatus 400.

FIG. 12 schematically shows an example of a functional configuration of the control apparatus 400. The control apparatus 400 includes a receiving unit 402, a storage unit 403, a remaining battery level acquisition unit 404, an electric power generation amount acquisition unit 406, a light-receiving amount acquisition unit 408, a position information acquisition unit 410, a selection unit 414, and a flying body control unit 416. Note that, it is not necessarily required for the control apparatus 400 to have all the configurations.

The receiving unit 402 is configured to receive information relating to situations of each of a plurality of flying bodies. The receiving unit 402 may also be configured to receive information relating to situations of each flying body from each of the plurality of flying bodies. The receiving unit 402 may also be configured to receive information, which is collected from another flying body by any of the plurality of flying bodies, from the flying body. The receiving unit 402 may also be configured to receive information relating to situations of each of the plurality of flying bodies from the management system 500.

The information may include configuration information of a flying body. The information may include function information of a flying body. The information may include position information of a flying body. The information may include a remaining battery level of a battery mounted on a flying body. The information may include an electric power generation amount by a solar cell panel mounted on a flying body. The information may include a light-receiving amount received by a solar cell panel mounted on a flying body. The storage unit 403 is configured to store the information received by the receiving unit 402.

The remaining battery level acquisition unit 404 is configured to acquire a remaining battery level of a battery mounted on each of the plurality of flying bodies. The remaining battery level acquisition unit 404 may also be configured to acquire a remaining battery level of a battery mounted on each of the plurality of flying bodies from the storage unit 403.

The electric power generation amount acquisition unit 406 is configured to acquire an electric power generation amount of each of the plurality of flying bodies. The electric power generation amount acquisition unit 406 may also be configured to acquire an electric power generation amount of each of the plurality of flying bodies from the storage unit 403.

The light-receiving amount acquisition unit 408 is configured to acquire a light-receiving amount of each of the plurality of flying bodies. The light-receiving amount acquisition unit 408 may also be configured to acquire a light-receiving amount of each of the plurality of flying bodies from the storage unit 403.

The position information acquisition unit 410 is configured to acquire position information of each of the plurality of flying bodies. The position information acquisition unit 410 may also be configured to acquire position information of each of the plurality of flying bodies from the storage unit 403.

The selection unit 414 is configured to select a flying body, which is required to combine with another flying body, from the plurality of flying bodies. The selection unit 414 is configured to select a flying body, which satisfies a predetermined condition, of the plurality of flying bodies, for example. The selection unit 414 is also configured to select a flying body of a combination target, which is to be combined with the selected flying body, from the plurality of flying bodies. The selection unit 414 is configured to select a flying body, which is closer to a flying body required to combine, of the plurality of flying bodies, for example. The selection unit 414 may also be configured to select the flying body of a combination target according to the satisfied condition.

The selection unit 414 is configured to select, as a flying body required to combine, a flying body for which a situation of the ground area covered by the communication area 150 satisfies a predetermined condition, for example. For example, when a flying body flying in a super rural area moves to a rural area, the selection unit 414 selects the flying body, as a flying body required to combine. In addition, for example, when a flying body flying in a rural area moves to an urban area, the selection unit 414 selects the flying body, as a flying body required to combine. In this case, the selection unit 414 selects, as the flying body of a combination target, a flying body having a similar configuration to a flying body required to combine, for example. In addition, for example, the selection unit 414 is configured to select, as the flying body of a combination target, a flying body that can provide wireless communication service having a higher communication capacity than wireless communication service by a flying body required to combine.

In addition, for example, the selection unit 414 is configured to select, as a flying body required to combine, a flying body for which a communication situation in the formed communication area 150 satisfies a predetermined condition. The condition is that a communication traffic in the communication area 150 is higher than a predetermined threshold value, for example. In this case, the selection unit 414 selects, as the flying body of a combination target, a flying body having a similar configuration to a flying body required to combine, for example. The selection unit 414 is also configured to select, as the flying body of a combination target, a flying body that can provide wireless communication service having a higher communication capacity than wireless communication service by a flying body required to combine, for example. After combining the flying body required to combine and the flying body of a combination target, when a communication situation in a communication area formed by the combined flying bodies satisfies a predetermined condition, the selection unit 414 may further select a flying body of a combination target to be combined with the combined flying bodies.

The selection unit 414 may set the flying body of a combination target to be different when the communication traffic in the communication area 150 is between a predetermined first threshold value and the second threshold value greater than the first threshold value and when the communication traffic in the communication area 150 is higher than the second threshold value. For example, when the communication traffic in the communication area 150 is between the first threshold value and a second threshold value, the selection unit 414 selects a flying body having a similar configuration to the flying body required to combine, and when the communication traffic in the communication area 150 is higher than the second threshold value, the selection unit 414 selects a flying body that can provide wireless communication service having a communication capacity higher than wireless communication service by the flying body required to combine.

The selection unit 414 is also configured to select, as the flying body required to combine, a flying body having a remaining battery level smaller than a predetermined threshold value, for example. In this case, the selection unit 414 is configured to select, as the flying body of a combination target, a flying body having an electric power supplying unit configured to supply electric power to another flying body combined thereto. The selection unit 414 may also be configured to select, as the flying body of a combination target, a flying body having an electric power supplying unit and a remaining battery level of the battery larger than a predetermined threshold value.

The selection unit 414 is also configured to select, as the flying body required to combine, a flying body where an electric power generation amount of the solar cell panel is smaller than a predetermined threshold value, for example. In this case, the selection unit 414 is configured to select, as the flying body of a combination target, a flying body having an electric power supplying unit configured to supply electric power to another flying body combined thereto. The selection unit 414 may also be configured to select, as the flying body of a combination target, a flying body having an electric power supplying unit and a remaining battery level of the battery larger than a predetermined threshold value.

The selection unit 414 is also configured to select, as the flying body required to combine, a flying body where a light-receiving amount of the solar cell panel is smaller than a predetermined threshold value, for example. In this case, the selection unit 414 is configured to select, as the flying body of a combination target, a flying body having an electric power supplying unit configured to supply electric power to another flying body combined thereto. The selection unit 414 may also be configured to select, as the flying body of a combination target, a flying body having an electric power supplying unit and a remaining battery level of the battery larger than a predetermined threshold value.

The selection unit 414 is also configured to select, as the flying body required to combine, a flying body for which a weather situation in a flight area where the flying body is flying satisfies a predetermined condition. The condition is that an airstream velocity in the flight area is greater than a predetermined threshold value, for example. The selection unit 414 is also configured to select, as the flying body required to combine, a flying body that is about to take off. In this case, the selection unit 414 is configured to select, as the flying body of a combination target, a flying body having a similar configuration to the flying body required to combine, for example. In addition, for example, the selection unit 414 is configured to select a flying body having a thrust mechanism configured to generate a thrust force higher than a thrust mechanism of the flying body required to combine.

The flying body control unit 416 is configured to control combination of the flying body required to combine and the flying body of a combination target, which are selected by the selection unit 414. The flying body control unit 416 may also be configured to transmit a control signal including information about a combination partner and a combination instruction to any of the flying body required to combine and the flying body of a combination target. The flying body control unit 416 may also be configured to transmit a control signal including information about a combination partner and a combination instruction to each of the flying body required to combine and the flying body of a combination target. The information about a combination partner may include identification information for identifying a flying body of a combination partner. The information about a combination partner may also include position information of a flying body of a combination partner.

Figure 13:
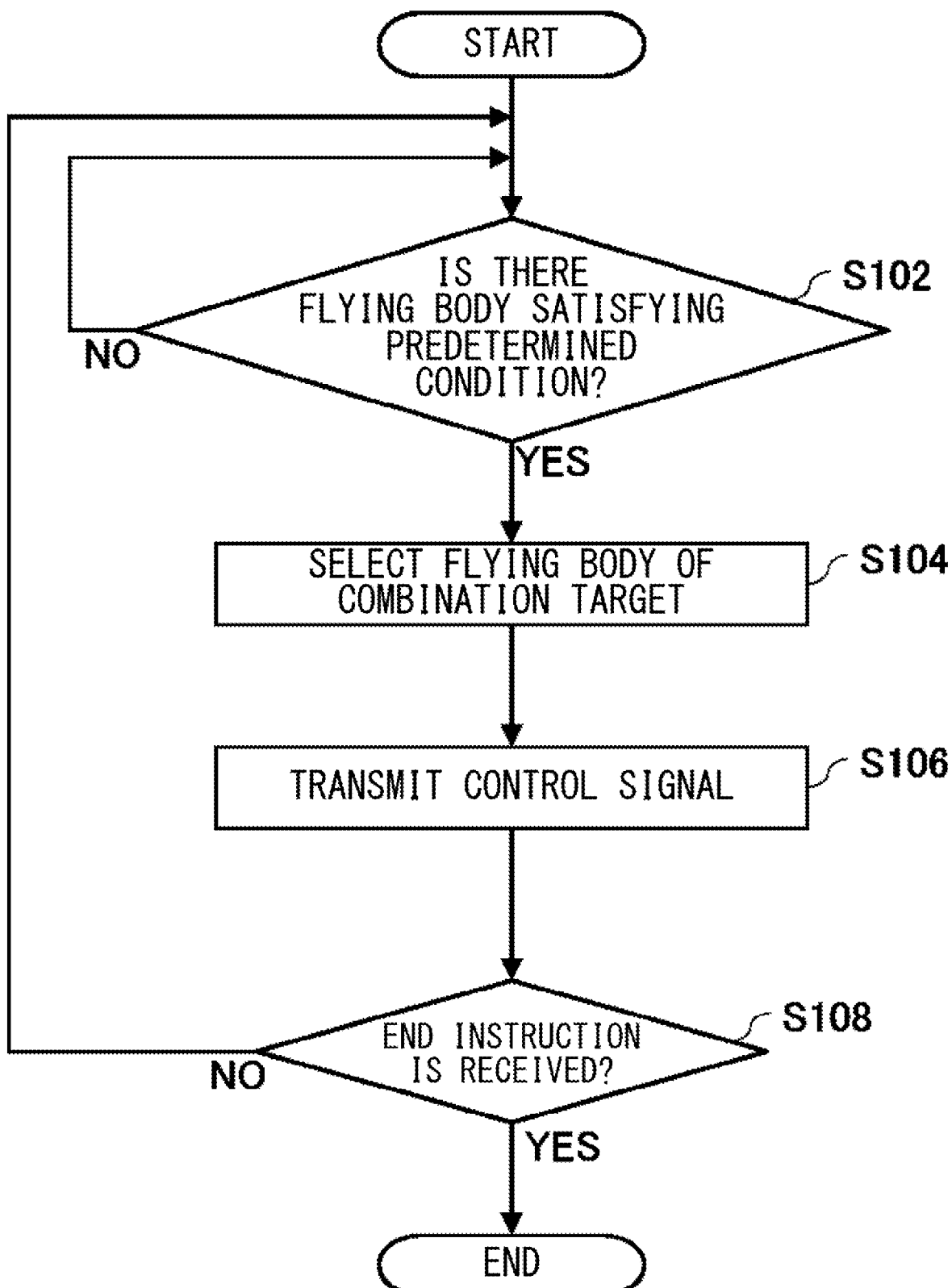
FIG. 13 schematically shows an example of a flow of processing that is executed by the control apparatus 400.

FIG. 13 schematically shows an example of processing that is executed by the control apparatus 400. Here, a state where the control apparatus 400 monitors situations of the plurality of flying bodies is described as a start state.

In step (step may be abbreviated as S) 102, the selection unit 414 determines whether there is a flying body, which satisfies a predetermined condition for determining whether the combination is required, of the plurality of flying bodies. When a result of the determination is affirmative, the flow proceeds to S104.

In S104, the selection unit 414 selects a flying body of a combination target that is to be combined with a flying body required to combine, according to the satisfied condition. In S106, the flying body control unit 416 transmits a control signal for combining the flying body required to combine and the flying body of a combination target to the flying body required to combine and the flying body of a combination target. Thereby, the flying body required to combine and the flying body of a combination target can be combined.

In S108, it is monitored whether an end instruction to end the monitoring is received. When it is determined that the end instruction is not received, the flow returns to S102, and when it is determined that the end instruction is received, the processing is over.

Figure 14:
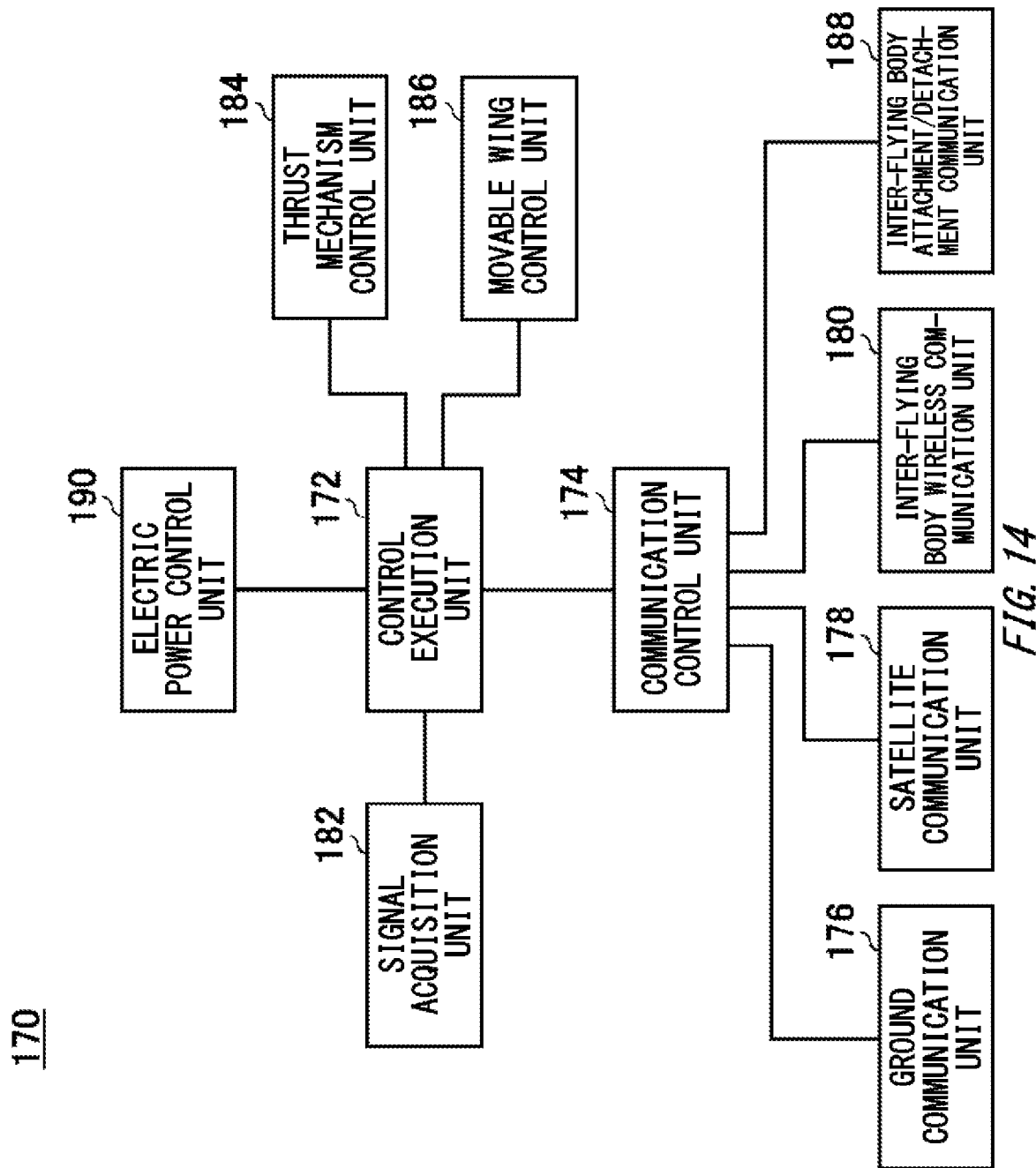
FIG. 14 schematically shows an example of a control apparatus 170 provided to the flying body 100.

FIG. 14 schematically shows an example of the functional configuration of a control apparatus 170 provided to the flying body 100. The control apparatus 170 is arranged in the main body 102 of the flying body 100, for example. The control apparatus 170 includes a control execution unit 172, a communication control unit 174, a ground communication unit 176, a satellite communication unit 178, an inter-flying body wireless communication unit 180, a signal acquisition unit 182, a thrust mechanism control unit 184, a movable wing control unit 186, an inter-flying body attachment/detachment communication unit 188, and an electric power control unit 190. Note that, it is not necessarily required for the control apparatus 170 to have all the configurations.

The control execution unit 172 is configured to execute a variety of controls. The communication control unit 174 is configured to control a variety of communications. The control execution unit 172 is configured to control communication by the ground communication unit 176, the satellite communication unit 178, the inter-flying body wireless communication unit 180, and the inter-flying body attachment/detachment communication unit 188.

The ground communication unit 176 is configured to form the communication area 150 on the ground and to communicate with a communication device on the ground. The ground communication unit 176 is configured to communicate with the user terminal 30, for example. The ground communication unit 176 is also configured to communicate with the control apparatus 400, for example. The ground communication unit 176 is also configured to communicate with the management system 500, for example.

The satellite communication unit 178 is configured to communicate with a communication satellite. The satellite communication unit 178 is configured to communicate with a communication satellite by using an antenna for communication with a communication satellite.

The inter-flying body wireless communication unit 180 is configured to wirelessly communicate with another flying body. The inter-flying body wireless communication unit 180 is configured to wirelessly communicate with another flying body by using an antenna for wireless communication with another flying body. The inter-flying body wireless communication unit 180 is configured to form a C2 link with another flying body by using the antenna, and to perform communication via the C2 link, for example. The inter-flying body wireless communication unit 180 is also configured to wirelessly communicate with another flying body by performing beam-forming for another flying body by using the antenna, for example.

The signal acquisition unit 182 is configured to acquire a control signal transmitted by the control apparatus 400. The signal acquisition unit 182 is configured to receive a control signal from the control apparatus 400 via the ground communication unit 176, for example. The signal acquisition unit 182 may also be configured to receive a control signal transmitted via the communication satellite 50 by the control apparatus 400, via the satellite communication unit 178. The signal acquisition unit 182 may also be configured to acquire a control signal, which is received from the control apparatus 400 by another flying body, from another flying body via the inter-flying body wireless communication unit 180.

The thrust mechanism control unit 184 is configured to control the thrust mechanism. The thrust mechanism control unit 184 is configured to control the plurality of propellers 108, for example.

The movable wing control unit 186 is configured to control a movable wing. The movable wing control unit 186 may be configured to control the movable wings 122. The movable wing control unit 186 may be configured to control the movable wings 124. The movable wing control unit 186 may be configured to control the movable wing 126.

The control execution unit 172 may also be configured to control flying of the flying body 100 by causing the thrust mechanism control unit 184 and the movable wing control unit 186 to control the thrust mechanism and the movable wing. For example, when the signal acquisition unit 182 acquires a control signal, the control execution unit 172 performs combination with a flying body of a combination target by causing the thrust mechanism control unit 184 and the movable wing control unit 186 to control the thrust mechanism and the movable wing, based on the control signal.

The inter-flying body attachment/detachment communication unit 188 is configured to communicate with the combined flying body. The inter-flying body attachment/detachment communication unit 188 is configured to communicate with the combined flying bodies via the attachment/detachment part.

The electric power control unit 190 is configured to perform electric power transmission with the combined flying body. The electric power control unit 190 may also be configured to control the electric power of the battery 120 to be supplied to the combined flying body via the attachment/detachment part. The electric power control unit 190 is also configured to store electric power supplied from the combined flying body in the battery 120 via the attachment/detachment part.

The flying body 100 may also have a fuel supplying and receiving unit configured to supply and receive fuel to and from the combined flying body, instead of the electric power control unit 190. The flying body 100 may also have the fuel supplying and receiving unit, together with the electric power control unit 190. The fuel supplying and receiving unit may also be configured to control fuel in a fuel tank of the flying body 100 to be supplied to the combined flying body via the attachment/detachment part. The fuel supplying and receiving unit may also be configured to control the fuel supplied from the combined flying body to be stored in the fuel tank of the flying body 100, via the attachment/detachment part.

Figure 15:
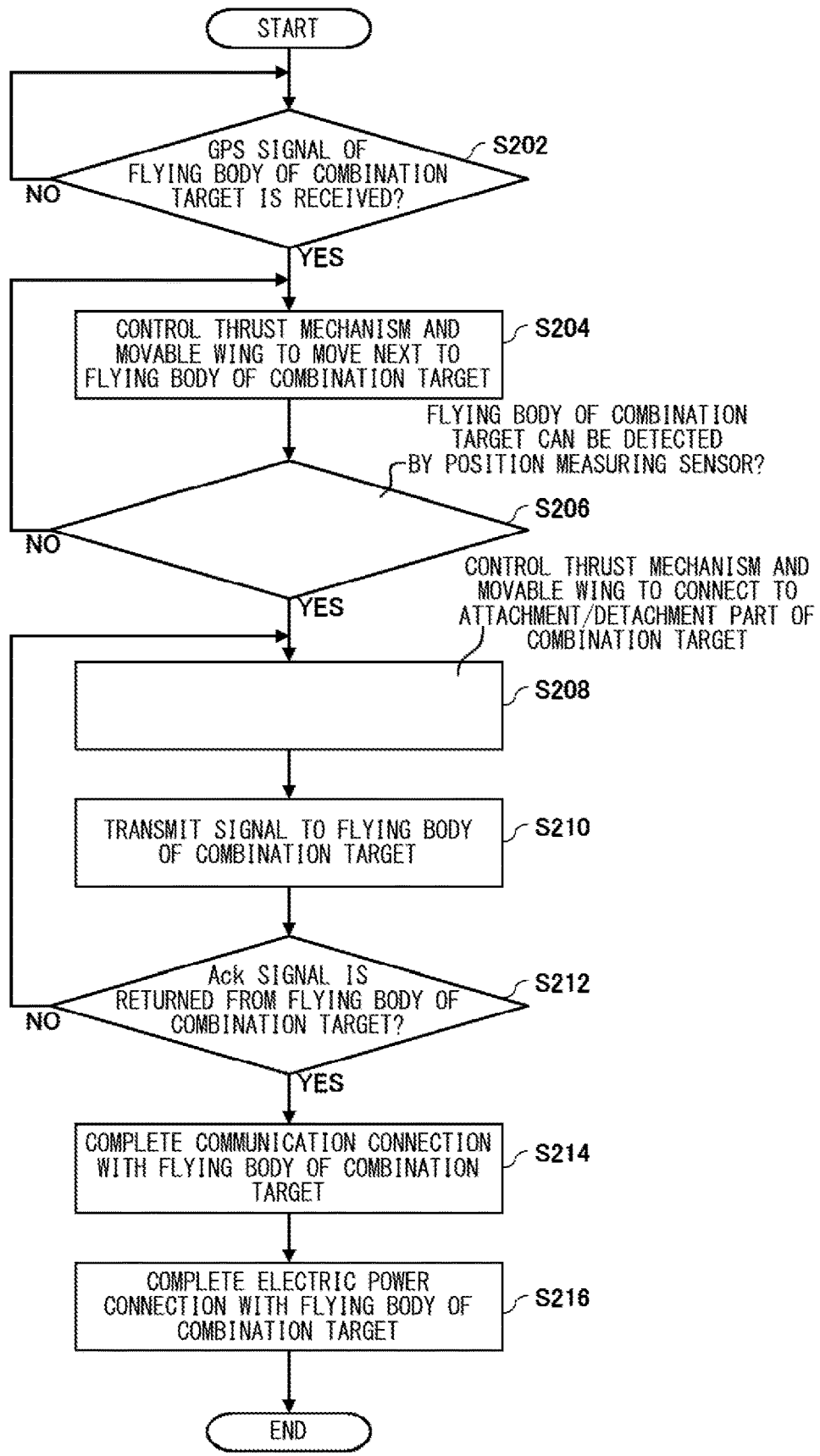
FIG. 15 schematically shows an example of a flow of processing that is executed by the control apparatus 170.

FIG. 15 schematically shows an example of processing that is executed by the control execution unit 172. Here, a flow of processing that is executed when the signal acquisition unit 182 receives a control signal from the control apparatus 400 is described.

In S202, the control execution unit 172 determines whether a GPS signal of a flying body of a combination target identified by the identification information of the flying body of a combination target included in the control signal is received. The control execution unit 172 determines that the GPS signal is received, when the GPS signal of the flying body of a combination target is received from the control apparatus 400 or when the GPS signal of the flying body of a combination target is received from the flying body of a combination target via the inter-flying body wireless communication unit 180, for example. When it is determined that the GPS signal is received, the flow proceeds to S204.

In S204, the control execution unit 172 controls the thrust mechanism and the movable wings via the thrust mechanism control unit 184 and the movable wing control unit 186 and moves next to the flying body of a combination target. In S206, the control execution unit 172 determines whether it is possible to detect the flying body of a combination target by the position measuring sensor 144. When the detection is possible, the flow proceeds to S208, and otherwise, returns to S204.

In S208, the control execution unit 172 controls the thrust mechanism and the movable wings via the thrust mechanism control unit 184 and the movable wing control unit 186, and connects the attachment/detachment part of the flying body 100 and the attachment/detachment part of the flying body of a combination target each other. In S210, the control execution unit 172 transmits a signal to the flying body of a combination target via the inter-flying body attachment/detachment communication unit 188. In S212, the control execution unit 172 determines whether an Ack signal is returned from the flying body of a combination target. When the Ack signal is returned, the flow proceeds to S214, and otherwise, returns to S208.

In S214, the control execution unit 172 completes communication connection with the flying body of a combination target. In S216, the control execution unit 172 completes electric power connection with the flying body of a combination target. For example, a relay may be arranged between the electric power connection portion 148 and the electric power control unit 190, and the control execution unit 172 may complete electric power connection by short-circuiting the relay. Then, the processing is over.

Figure 16:
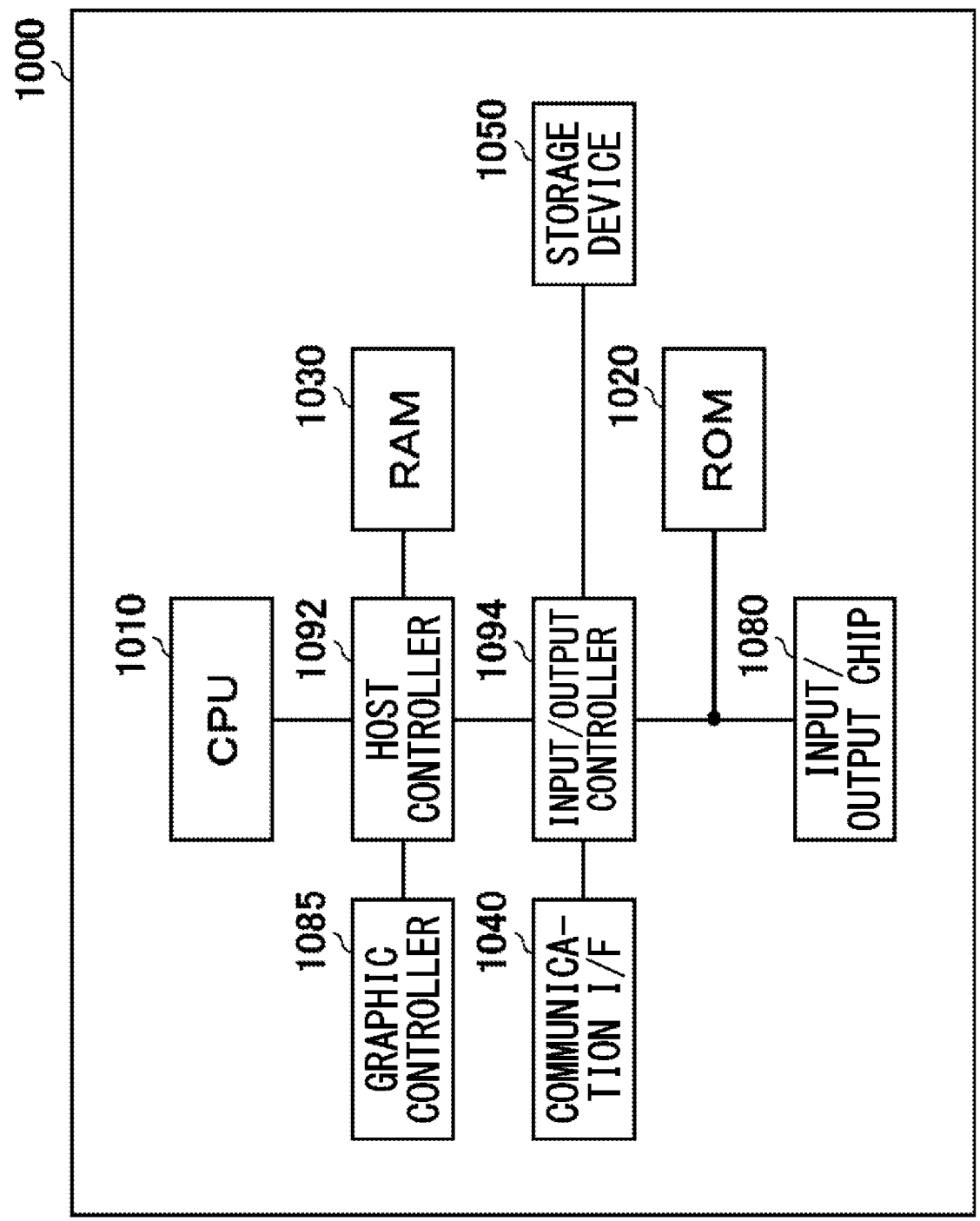
FIG. 16 schematically shows an example of a hardware configuration of a computer 1000 functioning as the control apparatus 400 or the control apparatus 170.

FIG. 16 schematically shows an example of a hardware configuration of a computer 1000 functioning as the control apparatus 400 or the control apparatus 170. The computer 1000 in accordance with the present embodiment includes a CPU peripheral unit including a CPU 1010, a RAM 1030 and a graphic controller 1085, which are mutually connected by a host controller 1092, and an input/output unit including a ROM 1020, a communication I/F 1040, a storage device 1050 and an input/output chip 1080, which are connected to the host controller 1092 by an input/output controller 1094.

The CPU 1010 is configured to operate based on programs stored in the ROM 1020 and the RAM 1030, thereby controlling each unit. The graphic controller 1085 is configured to acquire image data generated by the CPU 1010 on a frame buffer or the like provided in the RAM 1030, and to cause the image data to be displayed on a display. Instead, the graphic controller 1085 may include therein a frame buffer in which the image data generated by the CPU 1010 and the like are stored.

The communication I/F 1040 is configured to communicate with other devices via the network in a wired or wireless manner. The communication I/F 1040 also functions as hardware for communication. The storage device 1050 may be a hard disk drive, a solid state disk, a solid state drive and the like, and is configured to store programs and data that are used by the CPU 1010.

The ROM 1020 is configured to store therein a boot program that is executed by the computer 1000 at the time of activation, and a program and the like depending on the hardware of the computer 1000. The input/output chip 1080 is configured to connect various input/output units to the input/output controller 1094 via, for example, a USB port, a parallel port, a serial port, a keyboard port, a mouse port and the like.

The program that is provided to the storage device 1050 via the RAM 1030 is provided with being stored in a recording medium such as an IC card by a user. The program is read from the recording medium, is installed into the storage device 1050 via the RAM 1030, and is executed by the CPU 1010.

The program installed in the computer 1000 to cause the computer 1000 to function as the control apparatus 400 or the control apparatus 170 may activate the CPU 1010 and the like to cause the computer 1000 to function as the respective units of the control apparatus 400 or the control apparatus 170. The information processing described in the programs functions as the receiving unit 402, the storage unit 403, the remaining battery level acquisition unit 404, the electric power generation amount acquisition unit 406, the light-receiving amount acquisition unit 408, the position information acquisition unit 410, the selection unit 414, and the flying body control unit 416, which are specific means in which software and various types of hardware resources cooperate with each other, as the programs are read into the computer 1000. The information processing described in the programs also functions as the control execution unit 172, the communication control unit 174, the ground communication unit 176, the satellite communication unit 178, the inter-flying body wireless communication unit 180, the signal acquisition unit 182, the thrust mechanism control unit 184, the movable wing control unit 186, the inter-flying body attachment/detachment communication unit 188, and electric power control unit 190, which are specific means in which software and various types of hardware resources cooperate with each other, as the programs are read into the computer 1000. The specific means implements calculation or processing of information according to a use purpose of the computer 1000 of the present embodiment, so that the specific control apparatus 400 or control apparatus 170 is established according to the use purpose.

While the present invention have been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: network, 30: user terminal, 40: gateway, 50: communication satellite, 100: flying body, 102: main body, 104: main wing, 106: horizontal tail, 107: vertical tail, 108: propeller, 110: center antenna, 112: left wing-side antenna, 114: right wing-side antenna, 116: GPS transceiver, 118: solar cell panel, 120: battery, 122: movable wing, 124: movable wing, 126: movable wing, 130: left wing-side attachment/detachment part, 140: right wing-side attachment/detachment part, 142: structural concave connection portion, 144: position measuring sensor, 146: signal connection portion, 148: electric power connection portion, 150: communication area, 152: sub-cell, 160: upper surface-side attachment/detachment part, 166: cable, 168: attachment/detachment part, 170: control apparatus, 172: control execution unit, 174: communication control unit, 176: ground communication unit, 178: satellite communication unit, 180: inter-flying body wireless communication unit, 182: signal acquisition unit, 184: thrust mechanism control unit, 186: movable wing control unit, 188: inter-flying body attachment/detachment communication unit, 190: electric power control unit, 200: flying body, 210: center antenna, 212: left wing-side antenna, 214: right wing-side antenna, 230: left wing-side attachment/detachment part, 232: structural convex connection portion, 236: signal connection portion, 238: electric power connection portion, 260: upper surface-side attachment/detachment part, 262: lower surface-side attachment/detachment part, 264: connection part, 266: cable, 268: attachment/detachment part, 300: flying body, 310: center antenna, 312: left wing-side antenna, 314: right wing-side antenna, 362: lower surface-side attachment/detachment part, 364: connection part, 400: control apparatus, 402: receiving unit, 403: storage unit, 404: remaining battery level acquisition unit, 406: electric power generation amount acquisition unit, 408: light-receiving amount acquisition unit, 410: position information acquisition unit, 414: selection unit, 416: flying body control unit, 500: management system, 600: communication area, 1000: computer, 1010: CPU, 1020: ROM, 1030: RAM, 1040: communication I/F, 1050: storage device, 1080: input/output chip, 1085: graphic controller, 1092: host controller, 1094: input/output controller

What is claimed is:

1. A control apparatus for controlling a plurality of flying bodies including a first flying body having an antenna for forming a communication area by a beam irradiated toward the ground to provide wireless communication service for a user terminal in the communication area, the control apparatus comprising:
   a selection unit configured to select a flying body of a combination target to be combined with the first flying body from the plurality of flying bodies; and
   a flying body control unit configured to control combination of the first flying body and the flying body of a combination target,
   wherein the plurality of flying bodies includes a plurality of types of flying bodies, and the selection unit is configured to select the flying body of a combination target to be combined with the first flying body from the plurality of types of flying bodies, based on at least any of a situation in the communication area, a position of the first flying body, a situation in a ground area that the first flying body covers by the communication area and a situation in a flight area where the first flying body flies.

2. The control apparatus according to claim 1, wherein the plurality of flying bodies includes a second flying body having an antenna for forming a communication area by a beam irradiated toward the ground to provide wireless communication service for a user terminal in the communication area, and the selection unit selects the second flying body as the flying body of a combination target when a communication situation in the communication area of the first flying body satisfies a predetermined condition.

3. The control apparatus according to claim 2, wherein the plurality of flying bodies includes a third flying body having an antenna for forming a communication area by a beam irradiated toward the ground to provide wireless communication service for a user terminal in the communication area, and the selection unit selects the third flying body as a flying body of a combination target to be combined with the first flying body and the second flying body when a communication situation in a communication area formed by the first flying body and second flying body combined with each other satisfies a predetermined condition.

4. The control apparatus according to claim 2, wherein the plurality of flying bodies includes a fourth flying body having an antenna for forming a communication area by a beam irradiated toward the ground to provide wireless communication service for a user terminal in the communication area and configured to provide wireless communication service having a communication capacity greater than the wireless communication service provided by the second flying body, and the selection unit selects the second flying body as the flying body of a combination target to be combined with the first flying body when a communication situation in the communication area of the first flying body satisfies a predetermined first condition and selects the fourth flying body as the flying body of a combination target to be combined with the first flying body when the communication situation in the communication area of the first flying body satisfies a predetermined second condition.

5. The control apparatus according to claim 1, wherein the plurality of flying bodies includes a fifth flying body having an electric power supplying unit configured to supply electric power to another flying body combined thereto, and the selection unit selects the fifth flying body as the flying body of a combination target to be combined with the first flying body when a latitude of the first flying body satisfies a predetermined condition.

6. The control apparatus according to claim 2, wherein the plurality of flying bodies includes a fifth flying body having an electric power supplying unit configured to supply electric power to another flying body combined thereto, and the selection unit selects the fifth flying body as the flying body of a combination target to be combined with the first flying body when a latitude of the first flying body satisfies a predetermined condition.

7. The control apparatus according to claim 1, wherein the first flying body has a battery, the plurality of flying bodies includes a fifth flying body having an electric power supplying unit configured to supply electric power to another flying body combined thereto, the control apparatus comprises a remaining battery level acquisition unit configured to acquire a remaining battery level of the battery of the first flying body, and the selection unit selects the fifth flying body as the flying body of a combination target to be combined with the first flying body when the remaining battery level is smaller than a predetermined threshold value.

8. The control apparatus according to claim 2, wherein the first flying body has a battery, the plurality of flying bodies includes a fifth flying body having an electric power supplying unit configured to supply electric power to another flying body combined thereto, the control apparatus comprises a remaining battery level acquisition unit configured to acquire a remaining battery level of the battery of the first flying body, and the selection unit selects the fifth flying body as the flying body of a combination target to be combined with the first flying body when the remaining battery level is smaller than a predetermined threshold value.

9. The control apparatus according to claim 1, wherein the first flying body has a solar cell panel, the plurality of flying bodies includes a fifth flying body having an electric power supplying unit configured to supply electric power to another flying body combined thereto, the control apparatus comprises an electric power generation amount acquisition unit configured to acquire an electric power generation amount by the solar cell panel, and the selection unit selects the fifth flying body as the flying body of a combination target to be combined with the first flying body when the electric power generation amount is smaller than a predetermined threshold value.

10. The control apparatus according to claim 2, wherein the first flying body has a solar cell panel, the plurality of flying bodies includes a fifth flying body having an electric power supplying unit configured to supply electric power to another flying body combined thereto, the control apparatus comprises an electric power generation amount acquisition unit configured to acquire an electric power generation amount by the solar cell panel, and the selection unit selects the fifth flying body as the flying body of a combination target to be combined with the first flying body when the electric power generation amount is smaller than a predetermined threshold value.

11. The control apparatus according to claim 1, wherein the first flying body has a solar cell panel, the plurality of flying bodies includes a fifth flying body having an electric power supplying unit configured to supply electric power to another flying body combined thereto, the control apparatus comprises a light-receiving amount acquisition unit configured to acquire a light-receiving amount by the solar cell panel, and the selection unit selects the fifth flying body as the flying body of a combination target to be combined with the first flying body when the light-receiving amount is smaller than a predetermined threshold value.

12. The control apparatus according to claim 1, wherein
the first flying body has a thrust mechanism configured to generate a thrust force,
the plurality of flying bodies includes a sixth flying body having a thrust mechanism configured to generate a thrust force higher than the thrust mechanism of the first flying body, and
the selection unit selects the sixth flying body as the flying body of a combination target to be combined with the first flying body when a weather situation in the flight area satisfies a predetermined condition.

13. The control apparatus according to claim 1, wherein
each of the plurality of flying bodies has a plurality of propellers, and
the flying body control unit is configured to stop at least any of the plurality of propellers of the first flying body and the plurality of propellers of another flying body after the first flying body and the another flying body combine with each other.

14. The control apparatus according to claim 1, wherein
the plurality of flying bodies includes a seventh flying body having a wireless communication unit configured to wirelessly communicate with another flying body and an eighth flying body having an antenna configured to communicate with a communication satellite, and
the flying body control unit is configured to control the first flying body, the seventh flying body and the eighth flying body so that the seventh flying body is combined on an upper side of the first flying body and the eighth flying body is combined on an upper side of the seventh flying body.

15. A system comprising:
the control apparatus according to claim 1; and
the plurality of flying bodies.

16. A control apparatus for controlling a plurality of flying bodies including a first flying body having an antenna for forming a communication area by a beam irradiated toward the ground to provide wireless communication service for a user terminal in the communication area, the control apparatus comprising:
a selection unit configured to select a flying body of a combination target to be combined with the first flying body from the plurality of flying bodies; and
a flying body control unit configured to control combination of the first flying body and the flying body of a combination target, and
wherein each of the plurality of flying bodies has a plurality of propellers, and
the flying body control unit is configured to stop at least any of the plurality of propellers of the first flying body and the plurality of propellers of another flying body after the first flying body and the another flying body combine with each other.

17. A system comprising:
the control apparatus according to claim 13; and
the plurality of flying bodies.

18. A control apparatus for controlling a plurality of flying bodies including a first flying body having an antenna for forming a communication area by a beam irradiated toward the ground to provide wireless communication service for a user terminal in the communication area, the control apparatus comprising:
a selection unit configured to select a flying body of a combination target to be combined with the first flying body from the plurality of flying bodies; and
a flying body control unit configured to control combination of the first flying body and the flying body of a combination target,
wherein the plurality of flying bodies includes a second flying body having a wireless communication unit configured to wirelessly communicate with another flying body and a third flying body having an antenna configured to communicate with a communication satellite, and
the flying body control unit is configured to control the first flying body, the second flying body and the third flying body so that the second flying body is combined on an upper side of the first flying body and the third flying body is combined on an upper side of the second flying body.

19. A system comprising:
the control apparatus according to claim 15; and
the plurality of flying bodies.

20. A control method performed by a control apparatus which controls a plurality of flying bodies including a first flying body having an antenna for forming a communication area by a beam irradiated toward the ground to provide wireless communication service for a user terminal in the communication area, the control method comprising:
selecting a flying body of a combination target to be combined with the first flying body from the plurality of flying bodies, and
controlling combination of the first flying body and the flying body of a combination target,
wherein the plurality of flying bodies includes a plurality of types of flying bodies, and
in the selecting, the flying body of a combination target to be combined with the first flying body is selected from the plurality of types of flying bodies, based on at least any of a situation in the communication area, a position of the first flying body, a situation in a ground area that the first flying body covers by the communication area and a situation in a flight area where the first flying body flies.

* * * * *